(12) United States Patent
Kimoto et al.

(10) Patent No.: US 9,085,239 B2
(45) Date of Patent: Jul. 21, 2015

(54) PUSH-PULL CIRCUIT, DC/DC CONVERTER, SOLAR CHARGING SYSTEM, AND MOVABLE BODY

(75) Inventors: Kenji Kimoto, Osaka (JP); Hiroshi Igarashi, Osaka (JP); Yoshifumi Yaoi, Osaka (JP); Kenji Komiya, Osaka (JP); Masaru Nomura, Osaka (JP); Yoshiji Ohta, Osaka (JP); Hiroshi Iwata, Osaka (JP)

(73) Assignee: SHARP KABUSHIKI KAISHA, Osaka-shi (JP)

( * ) Notice: Subject to any disclaimer, the term of this patent is extended or adjusted under 35 U.S.C. 154(b) by 453 days.

(21) Appl. No.: 13/607,254

(22) Filed: Sep. 7, 2012

(65) Prior Publication Data

US 2013/0069582 A1 Mar. 21, 2013

(30) Foreign Application Priority Data

Sep. 21, 2011 (JP) ................................. 2011-205536

(51) Int. Cl.
*H01M 10/44* (2006.01)
*H01M 10/46* (2006.01)
(Continued)

(52) U.S. Cl.
CPC ............. *B60L 8/003* (2013.01); *B60L 11/1803* (2013.01); *B60L 11/1812* (2013.01); *B60L 11/1868* (2013.01); *B60L 15/007* (2013.01); *H02M 3/3372* (2013.01); *H02M 3/33592* (2013.01); *B60L 2210/10* (2013.01); *H02J 7/35* (2013.01); *Y02T 10/7005* (2013.01); *Y02T 10/7066* (2013.01); *Y02T 10/7083* (2013.01);
(Continued)

(58) Field of Classification Search
CPC ........ Y02T 10/7216; H02J 1/102; H02J 3/32; H02J 3/383; B60L 2210/10; H02M 1/4225; H05B 33/0815

USPC .......................................... 320/101, 117, 121
See application file for complete search history.

(56) References Cited

U.S. PATENT DOCUMENTS

| | | | |
|---|---|---|---|
| 6,493,242 B1 * | 12/2002 | Riggio et al. .................... | 363/16 |
| 2002/0001210 A1 | 1/2002 | Kuranuki et al. | |
| 2002/0141214 A1 | 10/2002 | Grover | |
| 2007/0025125 A1 | 2/2007 | Nakahori et al. | |
| 2010/0157632 A1 * | 6/2010 | Batten et al. .................... | 363/74 |

FOREIGN PATENT DOCUMENTS

| | | |
|---|---|---|
| JP | 8-275522 | 10/1996 |
| JP | 2000-50402 | 2/2000 |

(Continued)

OTHER PUBLICATIONS

Japanese Application No. 2011-186112 filed on Aug. 29, 2011 with English translation of relevant parts.

*Primary Examiner* — Nghia Doan
(74) *Attorney, Agent, or Firm* — Morrison & Foerster LLP

(57) ABSTRACT

A push-pull circuit comprising: a push-pull first switching element and second switching element; a first rectifier element; a third switching element for switching a pathway between conductance and cutoff, the pathway leading from a connection point between the first switching element and an inductive load via the first rectifier element to a connection point between a DC power source and a center tap of the inductive load; a second rectifier element; and a fourth switching element for switching a pathway between conductance and cutoff, the pathway leading from a connection point between the second switching element and the inductive load via the second rectifier element to a connection point between the DC power source and the center tap of the inductive load.

10 Claims, 18 Drawing Sheets

(51) Int. Cl.
*B60L 8/00* (2006.01)
*H02M 3/335* (2006.01)
*H02M 3/337* (2006.01)
*B60L 11/18* (2006.01)
*B60L 15/00* (2006.01)
*H02J 7/35* (2006.01)

(52) U.S. Cl.
CPC .............. *Y02T10/7216* (2013.01); *Y02T 10/92* (2013.01); *Y02T 90/127* (2013.01); *Y02T 90/14* (2013.01)

(56) References Cited

FOREIGN PATENT DOCUMENTS

| | | |
|---|---|---|
| JP | 2001-346380 | 12/2001 |
| JP | 2004-519991 | 7/2004 |
| JP | 2007-209084 | 8/2007 |
| JP | 2007-312464 | 11/2007 |
| JP | 2010-88259 | 4/2010 |
| JP | 2011-4469 | 1/2011 |
| WO | WO-2010/083435 | 7/2010 |

* cited by examiner

SURGE VOLTAGE
GENERATED
AT THE CONNECTING
POINTS A,B

ZUNER VOLTAGE
OF THE ZENER DIODES ZD1,ZD2

PUSH-PULL CIRCUIT, DC/DC CONVERTER, SOLAR CHARGING SYSTEM, AND MOVABLE BODY

This non-provisional application claims priority under 35 U.S.C. §119(a) on Patent Application No. 2011-205536 filed in Japan on Sep. 21, 2011, the entire contents of which are hereby incorporated by reference.

BACKGROUND OF THE INVENTION

1. Field of the Invention

The present invention relates to a push-pull circuit connected to an inductive load, and to a DC/DC converter, a solar charging system, and a movable body provided with the push-pull circuit.

2. Description of the Related Art

A push-pull circuit for converting DC voltage outputted from a DC power source into a pulse voltage is sometimes used in a power source device. For example, the power source device disclosed in Japanese Laid-open Patent Application No. 2000-50402 comprises a push-pull circuit 101, a transformer 102, a full-bridge circuit 103, and a step-up chopper circuit provided between a capacitor 104 and a main battery 105, as shown in FIG. 19.

The power source device disclosed in Japanese Laid-open Patent Application No. 2000-50402 cuts off a relay contact 106 when the main battery 105 is charged from an auxiliary equipment battery 100, and performs a step-up operation via the push-pull circuit 101, the transformer 102, the full-bridge circuit 103 (used as a rectifier circuit), and the step-up chopper circuit. Also, the power source device disclosed in Japanese Laid-open Patent Application No. 2000-50402 allows conduction through the relay contact 106 when the auxiliary equipment battery 100 is charged from the main battery 105, and performs a step-down operation via the full-bridge circuit 103, the transformer 102, and the push-pull circuit 101.

The power supply device disclosed in Japanese Laid-open Patent Application No. 2000-50402 is limited to application in a hybrid electric automobile. Accordingly, in the power supply device disclosed in Japanese Laid-open Patent Application No. 2000-50402, the main application is to charge the auxiliary equipment battery 100 from the main battery 105, and charging the main battery 105 from the auxiliary equipment battery 100 is mainly carried out for reverse transmission of electricity from the auxiliary equipment battery 100 to an engine startup motor when there is insufficient power in the main battery 105. Therefore, the power supply device disclosed in Japanese Laid-open Patent Application No. 2000-50402 does not require high power transmission.

However, there is a need for higher-efficiency power transmission in accompaniment with higher capacity cells mounted in automobiles in recent years. A particular problem in electric automobiles is cruising distance, and a system that makes efficient use of electricity is essential.

Nevertheless, in the power supply device disclosed in Japanese Laid-open Patent Application No. 2000-50402, there is a problem in that power transmission between the main battery 105 and the auxiliary equipment battery 100 cannot be carried out efficiently.

In the case that a large current flows to the push-pull circuit 101 during a step-up operation, a very large surge voltage due to parasitic inductance (not shown in FIG. 19) of the transformer 102 is generated when a transistor Q1 or Q2 switches from an on state to an off state. This surge voltage is substantially proportional to the value of the electric current that flows to the transistor immediately prior to switching. Therefore, the surge voltage increases in correspondence to a higher electric current flowing to the circuit, and the circuit is more readily destroyed. When Zener diodes ZD1, ZD2 are provided in the manner shown in FIG. 20 in order to prevent the circuit from being destroyed by the surge voltage, there is a large loss that occurs when the surge component equal to or greater than the Zener voltage (the shaded portion of FIG. 21) is discarded to GND via the Zener diode ZD1 in the case that the surge voltage is generated at a connection point A between the drain of the transistor $T_{L1}$, which is an N-channel metal oxide semiconductor field effect transistor (MOSFET), and one end of the low-voltage windings of the transformer TR1, and when the surge component equal to or greater than the Zener voltage (the shaded portion of FIG. 21) is discharged to GND via the Zener diode ZD2 in the case that he surge voltage is generated at a connection point B between the drain of the transistor $T_{L2}$, which is an N-channel MOSFET, and one end of the low-voltage windings of the transformer TR1.

The battery B1 of FIG. 20 corresponds to the auxiliary equipment battery 100 of FIG. 19. The transistor $T_{L1}$, which is the N-channel MOSFET of FIG. 20, corresponds to the transistor Q1, which is an NPN bipolar transistor, in FIG. 19, and the transistor $T_{L2}$, which is the N-channel MOSFET of FIG. 20, corresponds to the transistor Q2, which is an NPN bipolar transistor, in FIG. 19. The transformer TR1 of FIG. 20 corresponds to the transformer 102 in FIG. 19. The transistors $T_{H1}$ to $T_{H4}$, which are N-channel MOSFETs in FIG. 20, correspond to the transistors Q3 to Q6, which are N-channel MOSFETs, in FIG. 19. The capacitor $C_H$ of FIG. 20 corresponds to the capacitor 104 in FIG. 19. In FIG. 20, the parasitic inductance of the low-voltage windings of the transformer TR1 is shown as parasitic inductors PL1 and PL2.

SUMMARY OF THE INVENTION

An object of the present invention is to provide a push-pull circuit capable of inhibiting surge voltage and increasing efficiency, and a DC/DC converter, a solar charging system, and a movable body provided with the push-pull circuit.

In order to achieve the object described above, the push-pull circuit according to an aspect of the present invention (first aspect) comprises:

a first switching element having one end connected to one end of an inductive load and the other end connected to one end of a DC power source;

a second switching element having one end connected to the other end of the inductive load and the other end connected to one end of the DC power source;

a first rectifier element;

a third switching element for switching a pathway between conductance and cutoff, the pathway leading from a connection point between one end of the first switching element and one end of the inductive load, via the first rectifier element, to a connection point between the other end of the DC power source and a center tap of the inductive load;

a second rectifier element; and a fourth switching element for switching a pathway between conductance and cutoff, the pathway leading from a connection point between one end of the second switching element and the other end of the inductive load, via the second rectifier element, to a connection point between the other end of the DC power source and the center tap of the inductive load.

A push-pull circuit according to another aspect (second aspect) may be the push-pull circuit according to the first aspect, in which each of the first to fourth switching elements is switched ON or OFF so that the third switching element is in an ON state when the first switching element switches from ON to OFF, and the third switching element is in an OFF state when the second switching element switches from OFF to ON; and the fourth switching element is in an ON state when the second switching element switches from ON to OFF, and the fourth switching element is in an OFF state when the first switching element switches from OFF to ON.

A push-pull circuit according to another aspect (third aspect) may be the push-pull circuit according to the first or second aspect, in which the third switching element and the fourth switching element are normally-off transistors; the push-pull circuit further comprising: a first power source circuit for generating voltage for setting one of the third switching element and the fourth switching element to ON, using the voltage of the connection point between one end of the first switching element and one end of the inductive load; and a second power source circuit for generating voltage for setting the other of the third switching element and the fourth switching element to ON, using the voltage of the connection point between one end of the second switching element and the other end of the inductive load.

A push-pull circuit according to another aspect (fourth aspect) may be the push-pull circuit according to the first or second aspect, in which the third switching element and the fourth switching element are normally-on transistors.

A push-pull circuit according to another aspect (fifth aspect) may be the push-pull circuit according to the first or second aspect, in which the third switching element and the fourth switching element are PNP bipolar transistors.

A push-pull circuit according to another aspect (sixth aspect) may be the push-pull circuit according to any of the first through fifth aspects, in which the first rectifier element and the second rectifier element are switching elements for synchronous rectification.

A push-pull circuit according to another aspect (seventh aspect) may be the push-pull circuit according to the sixth aspect, in which each of the first to fourth switching elements, the first rectifier element, and the second rectifier element is switched ON or OFF so that the first rectifier element switches from OFF to ON after the first switching element has switched from ON to OFF, and the first rectifier element switches from ON to OFF before the third switching element switches from ON to OFF; and the second rectifier element switches from OFF to ON after the second switching element has switched from ON to OFF, and the second rectifier element switches from ON to OFF before the fourth switching element switches from ON to OFF.

The DC/DC converter according to the present invention comprises a transformer and a push-pull circuit connected to the transformer, the push-pull circuit being the push-pull circuit according to any of the first to seventh aspects described above.

A solar charging system according to the present invention comprises: a solar cell; a first storage device for storing power outputted from the solar cell; a second storage device having greater storage capacity than the first storage device; and a DC/DC converter for DC/DC converting DC voltage outputted from the first storage device and feeding the converted voltage to the second storage device. The DC/DC converter of the configuration described above is preferably a bidirectional DC/DC converter that can perform DC/DC conversion in two directions.

The movable body according to the present invention comprises the solar charging system of the aspect described above.

In a preferred aspect of the movable body described above, the power outputted from the second storage device constituting the solar charging system is used as power for driving the movable body. It is furthermore preferred that the voltage of the second storage device be made greater than the voltage of the first storage device.

DETAILED DESCRIPTION OF PREFERRED EMBODIMENTS

Embodiments of the present invention are described below with reference to the drawings.

Figure 1:
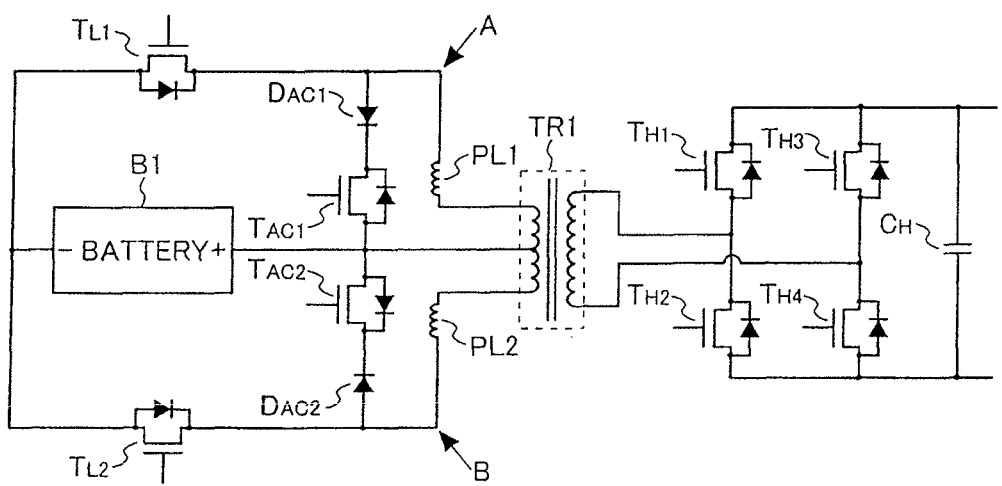
FIG. 1 is a diagram showing the configuration of the push-pull circuit according to a first embodiment of the present invention.

FIG. 1 is a diagram showing the configuration of the push-pull circuit according to a first embodiment of the present invention. The push-pull circuit according to the first embodiment of the present invention shown in FIG. 1 comprises: transistors $T_{L1}$ and $T_{L2}$, which are N-channel MOSFETs; diodes $D_{AC1}$ and $D_{AC2}$; and transistors $T_{AC1}$ and $T_{AC2}$, which are N-channel MOSFETs;

The drain of the transistor $T_{L1}$ is connected to one end of the low-voltage winding of the transformer TR1, the drain of the transistor $T_{L2}$ is connected to the other end of the low-voltage winding of the transformer TR1, and the source of the transistors $T_{L1}$ and $T_{L2}$ are connected to the negative pole of a battery B1. In FIG. 1, a parasitic inductance of the low-voltage winding transformer TR1 is shown as parasitic inductors PL1 and PL2. Diodes (hereinafter referred to as parallel diodes) are arranged in a row between the source and drain of the transistors, but the parallel diodes may be parasitic diodes (built-in diodes) of the transistors, or may be diodes externally connected in parallel, or another configuration.

The anode of a diode $D_{AC1}$ is connected to the drain of the transistor $T_{L1}$, the cathode of the diode $D_{AC1}$ is connected to the drain of a transistor $T_{AC1}$, and the source of the transistor $T_{AC1}$ is connected to the positive pole of the battery B1 and to the center tap of the low-voltage winding of the transformer TR1. Similarly, the anode of a diode $D_{AC2}$ is connected to the drain of the transistor $T_{L2}$, the cathode of the diode $D_{AC2}$ is connected to the drain of a transistor $T_{AC2}$, and the source of the transistor $T_{AC2}$ is connected to the positive pole of the battery B1 and to the center tap of the low-voltage winding of the transformer TR1.

A full-bridge circuit composed of transistors $T_{H1}$ to $T_{H4}$, which are N-channel MOSFETs, is connected to the high-voltage winding of the transformer TR1, and a capacitor $C_H$ is connected to the full-bridge circuit. In this way, the DC voltage outputted from the battery B1 can be stepped up via the pathway of the push-pull circuit according to the first embodiment of the present invention, the transformer TR1, and the full-bridge circuit described above and smoothed by the capacitor $C_H$; and the voltage at the two ends of the capacitor $C_H$ can be stepped down via the pathway of the full-bridge circuit described above, the transformer TR1, and the push-pull circuit according to the first embodiment of the present invention, and then fed to the battery B1.

In the push-pull circuit according to the first embodiment of the present invention shown in FIG. 1, the transistor $T_{AC1}$ switches the conductance and cutoff of the pathway from the connecting point A between the drain of the transistor $T_{L1}$ and one end of the low-voltage winding of the transformer TR1 to the connecting point between the positive pole of the battery B1 and the center tap of the low-voltage winding of the transformer TR1 via the diode $D_{AC1}$. When a surge component is generated by a parasitic inductor PL1 of the transformer TR1 when the pathway is conducting, the surge component flows back to the connecting point between the positive pole of the battery B1 and the center tap of the low-voltage winding of the transformer TR1 via the diode $D_{AC1}$. Similarly, in the push-pull circuit according to the first embodiment of the present invention shown in FIG. 1, the transistor $T_{AC2}$ switches the conductance and cutoff of the pathway from the connecting point B between the drain of the transistor $T_{L2}$ and the other end of the low-voltage winding of the transformer TRI to the connecting point between the positive pole of the battery B1 and the center tap of the low-voltage winding of the transformer TR1 via the diode $D_{AC2}$. When a surge component is generated by a parasitic inductor PL2 of the transformer TR1 when the pathway is conducting, the surge component flows back to the connecting point between the positive pole of the battery B1 and the center tap of the low-voltage winding of the transformer TR1 via the diode $D_{AC2}$.

Figure 2:
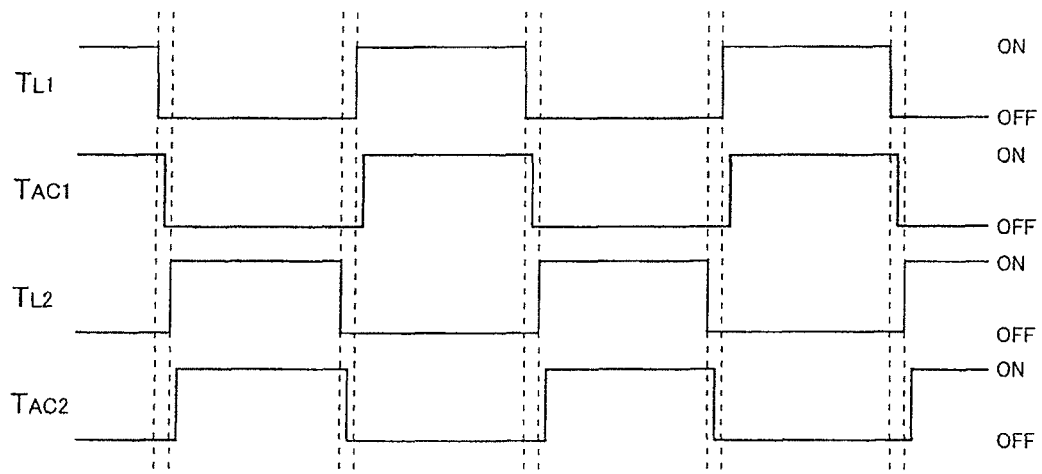
FIG. 2 is a timing chart showing the timing for switching on and off the transistors of the push-pull circuit according to the first embodiment of the present invention.

Therefore, the transistor $T_{AC1}$ must be in an ON state when the transistor $T_{L1}$ switches from ON to OFF, the transistor $T_{AC1}$ must be in OFF state when the transistor $T_{L2}$ switches from OFF to ON, the transistor $T_{AC2}$ must be in an ON state when the transistor $T_{L2}$ switches from ON to OFF, the transistor $T_{AC2}$ must be in OFF state when the transistor $T_{L1}$ switches from OFF to ON. Accordingly, the ON and OFF switching of the transistors $T_{L1}$, $T_{L2}$, $T_{AC1}$, and $T_{AC2}$ may be carried out with timing such as that shown in, e.g., FIG. 2. In the case that the ON and OFF switching of the transistors $T_{L1}$, $T_{L2}$, $T_{AC1}$, and $T_{AC2}$ is carried out with timing such as that shown in FIG. 2, the control signal fed to the control terminal of the transistor $T_{AC1}$ can be generated by merely delaying the control signal fed to the control terminal of the transistor $T_{LA}$, and the control signal fed to the control terminal of the transistor $T_{AC2}$ can be generated merely by delaying the control signal fed to the control terminal of the transistor $T_{L2}$. Therefore, the control signal fed to the control terminal of the transistor $T_{AC1}$ and the control signal fed to the control terminal of the transistor $T_{AC2}$ are more readily generated.

Figure 3:
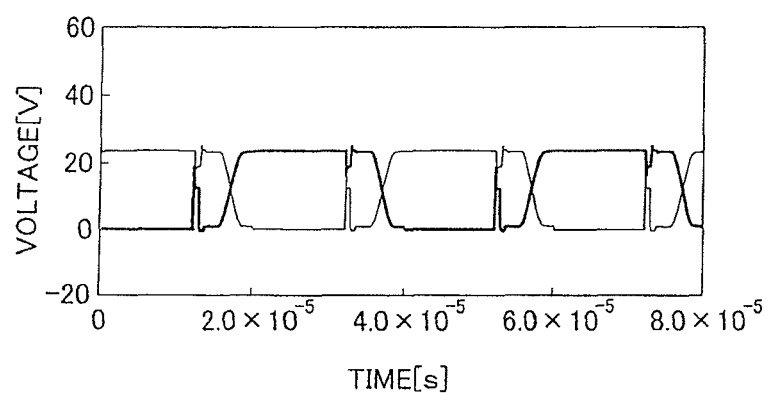
FIG. 3 is a graph showing the results obtained by simulating the voltage of the connection point A and the voltage of the connection point B of the push-pull circuit according to the first embodiment of the present invention.
Figure 4:
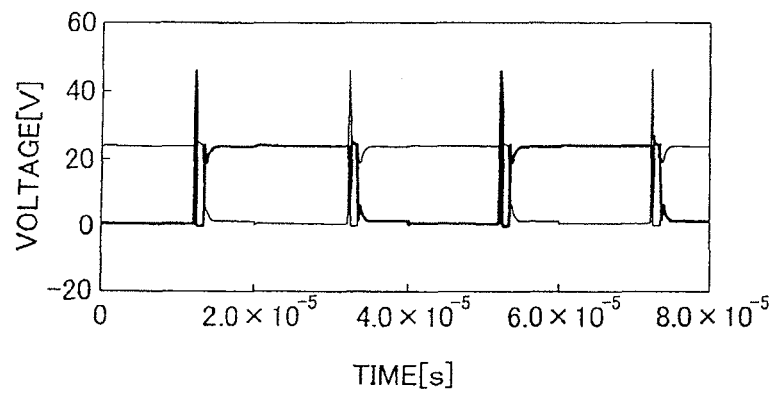
FIG. 4 is a graph showing the results obtained by simulating the voltage of the connection point A and the voltage of the connection point B of the push-pull circuit shown in FIG. 20.
Figure 20:
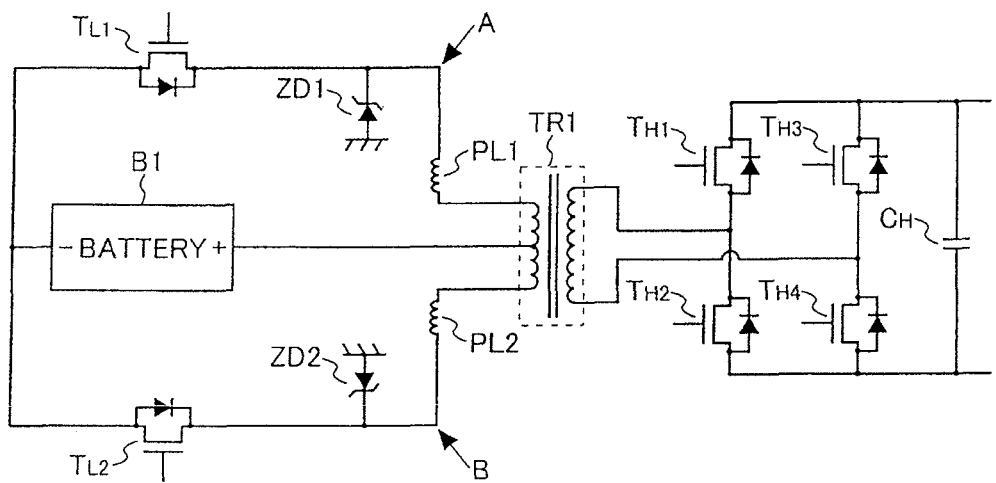
FIG. 20 is a diagram showing a configuration example of a conventional push-pull circuit.
Figure 21:
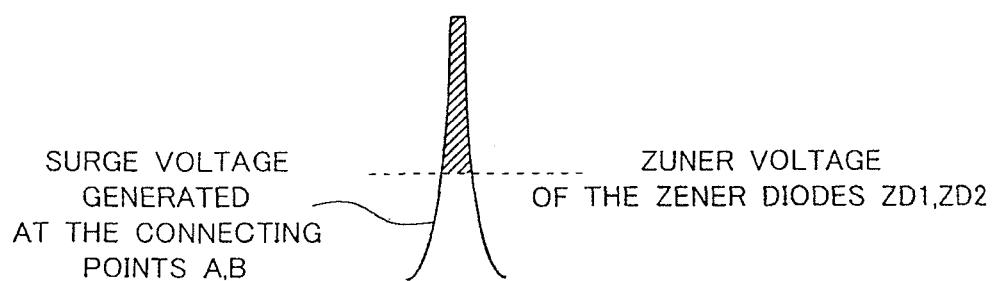
FIG. 21 is a diagram showing the surge component discarded to GND in the case that a surge voltage occurs in the conventional push-pull circuit shown in FIG. 20.

Here, FIG. 3 shows the results obtained by simulating the voltage of the connecting point A and the voltage of the connecting point B of the push-pull circuit according to the first embodiment of the present invention shown in FIG. 1. Also, for comparison, FIG. 4 shows the results obtained by simulating the voltage of the connecting point A and the voltage of the connecting point B of the push-pull circuit shown in FIG. 20. In FIGS. 3 and 4, the thick line shows the voltage of the connecting point A and the narrow line shows the voltage of the connecting point B. In FIGS. 3 and 4, the voltage of the battery B1 is 12 V.

In accordance with the push-pull circuit according to the first embodiment of the present invention shown in FIG. 1, it is possible to considerably reduce the voltage step-up of the connecting point A brought about by the parasitic inductor PL1 of the transformer TR1 and the voltage step-up of the connecting point B brought about by the parasitic inductor PL2 of the transformer TR1. Accordingly, it is possible to prevent the voltages of the connecting points A and B from increasing beyond the withstand voltage of the transistors $T_{L1}$, $T_{L2}$ and to prevent the transistors $T_{L1}$, $T_{L2}$ from being destroyed. Also, in the push-pull circuit according to the first embodiment of the present invention shown in FIG. 1, the surge component produced by the parasitic inductors PL1 and PL2 of the transformer TR1 is not discarded to the exterior of the circuit, but is rather made to flow back through the electric current pathway: the connecting point A, the diode $D_{AC1}$, the transistor $T_{AC1}$, the center tap of the transformer TR1, the parasitic inductor PL1, and the connecting point A; or the pathway: the connecting point B, the diode $D_{AC2}$, the transistor $T_{AC2}$, the center tap of the transformer TR1, the parasitic inductor PL2, and the connecting point B. Therefore, the energy accumulated in the parasitic inductors PL1, PL2 can be transferred to the high-voltage side (without being consumed by Zener diodes or the like), and loss can therefore be considerably reduced.

Next, an example of the power source configuration of the driver for driving the transistors $T_{AC1}$, $T_{AC2}$ will be described.

Figure 5:
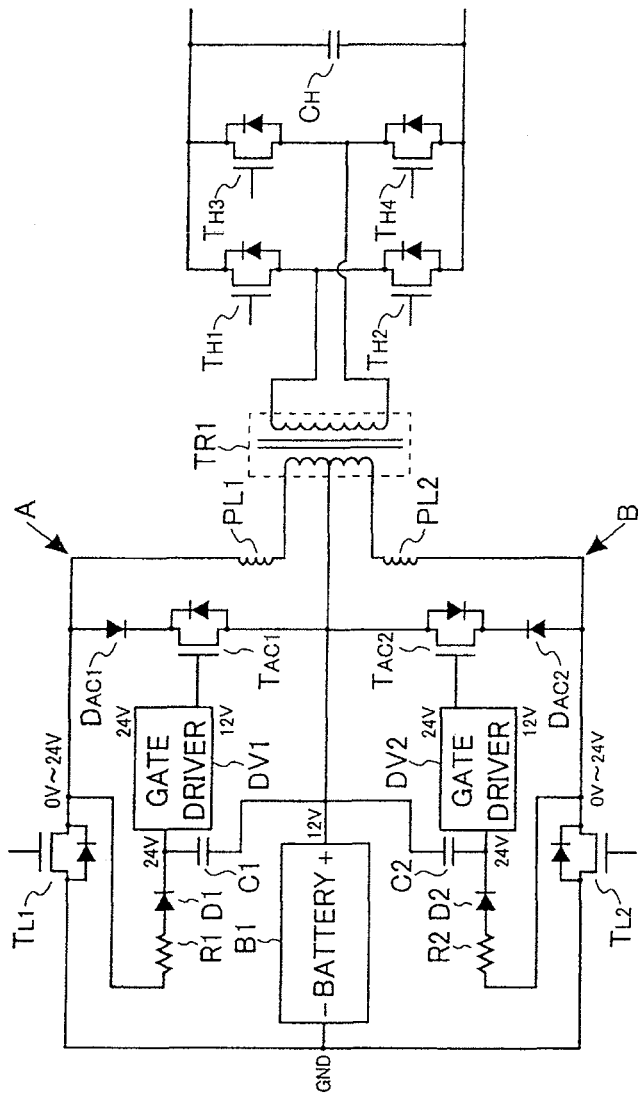
FIG. 5 is a diagram showing a first example of the power source configuration of the driver for driving the transistors.

FIG. 5 is a first example of the power source configuration of the driver for driving the transistors $T_{AC1}$, $T_{AC2}$. In FIG. 5, the same reference numerals are used for the same portions in FIG. 1, and a detailed description thereof is omitted. The voltage value described in FIG. 5 is an example.

In the first example shown in FIG. 5, the transistors $T_{AC1}$ and $T_{AC2}$ are each normally-off transistors. For example, in the case that the voltage of the battery B1 is 12 V, a gate driver DV1 for driving the transistor $T_{AC1}$ requires a power source (e.g., a 24-V power source) having a voltage obtained by adding the voltage that exceeds the threshold voltage of the transistor $T_{AC1}$ to the source voltage (e.g., 12 V) of the transistor $T_{AC1}$, and a gate driver DV2 for driving the transistor $T_{AC2}$ requires a power source (e.g., a 24-V power source) having a voltage obtained by adding the voltage that exceeds the threshold voltage of the transistor $T_{AC2}$ to the source voltage (e.g., 12 V) of the transistor $T_{AC2}$. In view of this fact, in the first example shown in FIG. 5, a power source (e.g., a 24-V power source) in which the drain voltage of the transistor $T_{L1}$ is smoothed via a resistance R1 and a back flow-preventing diode D1 and furthermore by the capacitor C1 to obtain a DC voltage is connected to the gate driver DV1; and a power source (e.g., a 24-V power source) in which the drain voltage of the transistor $T_{L2}$ is smoothed via a resistance R2 and a back flow-preventing diode D2 and furthermore by the capacitor C2 to obtain a DC voltage is connected to the gate driver DV2. Although not shown in the diagram, a power source (e.g., the source terminal of the transistor $T_{AC1}$) having a voltage for setting the transistor $T_{AC1}$ to OFF is also connected to the gate driver DV1, and a power source (e.g., the source terminal of the transistor $T_{AC2}$) having a voltage for setting the transistor $T_{AC2}$ to OFF is also connected to the gate driver DV2. It is also possible to connect to the gate driver DV2 a power source (e.g., a 24-V power source) for obtaining a DC voltage using the drain voltage of the transistor $T_{L1}$, and to connect to the gate driver DV1 a power source (e.g., a 24-V power source) for obtaining a DC voltage using the drain voltage of the transistor $T_{L2}$, which differs from the first example shown in FIG. 5. The reason that a power source voltage for driving such transistors $T_{AC1}$, $T_{AC2}$ is that the drain voltage of the transistor $T_{AC1}$ when the transistor $T_{AC1}$ is OFF, and the drain voltage of the transistor $T_{AC2}$ when the transistor $T_{AC2}$ is OFF are about double (e.g., 24 V) the voltage (e.g., 12 V) of the battery B1, as shown in FIG. 3.

In accordance with such a power source configuration, a simple circuit configuration is achieved because there is no need to provide a special circuit for generating a voltage obtained by adding the voltage that exceeds the threshold voltage of the transistor $T_{AC1}$ to the source voltage (e.g., 12 V) of the transistor $T_{AC1}$, (e.g., a circuit for stepping up the output voltage of the battery B1 to a double voltage); and a special circuit for generating a voltage obtained by adding the voltage that exceeds the threshold voltage of the transistor $T_{AC2}$ to the source voltage (e.g., 12 V) of the transistor $T_{AC2}$, (e.g., a circuit for stepping up the output voltage of the battery B1 to a double voltage).

Figure 6:
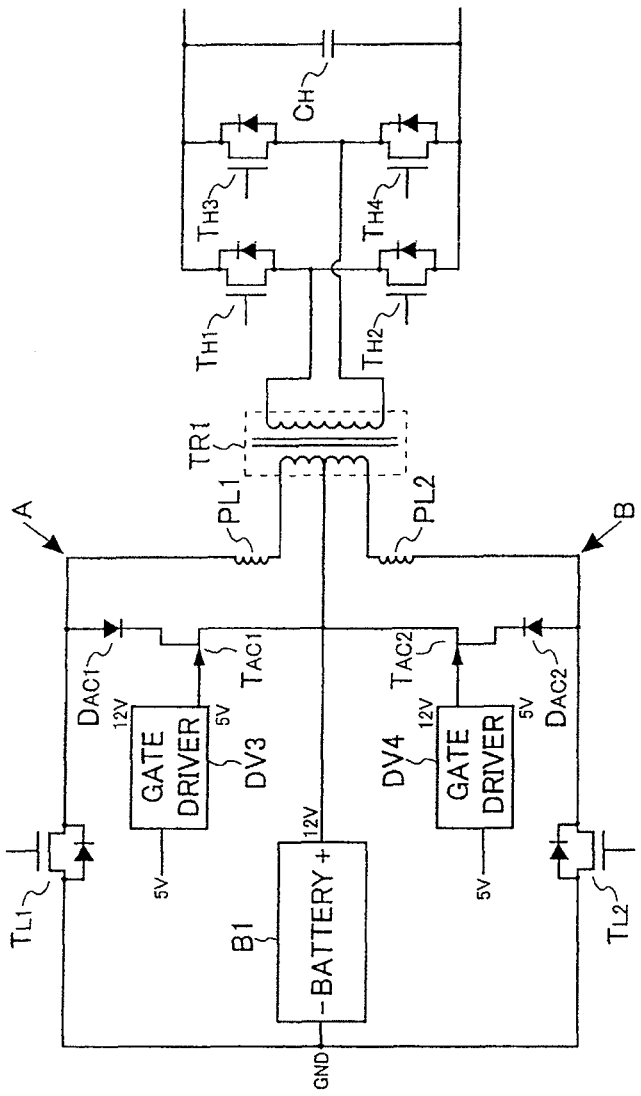
FIG. 6 is a diagram showing a second example of the power source configuration of the driver for driving the transistors.

FIG. 6 shows a second example of the power source configuration of the driver for driving the transistors $T_{AC1}$ and $T_{AC2}$. In FIG. 6, the same reference numerals are used for the same portions in FIG. 1, and a detailed description thereof is omitted. The voltage value described in FIG. 6 is an example.

In the second example shown in FIG. 6, the transistors $T_{AC1}$ and $T_{AC2}$ are each normally-on transistors. In this case, the gate driver DV3 for driving the transistor $T_{AC1}$ does not require a power source having a greater voltage than the source voltage (e.g., 12 V) of the transistor $T_{AC1}$, and the gate driver DV4 for driving the transistor $T_{AC2}$ does not require a power source having a greater voltage than the source voltage (e.g., 12 V) of the transistor $T_{AC2}$. In view of this fact, in the second example shown in FIG. 6, another control circuit power source (e.g., a 5-V power source) is connected to the gate drivers DV3 and DV4. In other words, another control circuit power source (e.g., a 5-V power source) is shared by other control circuits (e.g., drivers for driving other transistors, sensors, and the like) and the gate drivers DV3 and DV4. Although not shown in the drawing, a power source (e.g., a 12-V power source) having a voltage for setting the transistor $T_{AC1}$ to ON is also connected to the gate driver DV3, and a power source (e.g., a 12-V power source) having a voltage for setting the transistor $T_{AC2}$ to ON is also connected to the gate driver DV4.

In accordance with such a power source configuration, the number of components constituting the power source circuit can be reduced because a power source dedicated to the gate drivers DV3 and DV4 is not required to be provided. Also, loss can be further reduced in the second example shown in FIG. 6 by using a GaN-based transistor, a SiC-based transistor, or another compound transistor having an ON resistance that is less than a Si-based transistor, as the transistors $T_{AC1}$ and $T_{AC2}$, which are normally-on transistors. In the case that a compound transistor is used as the transistors $T_{AC1}$ and $T_{AC2}$, a built-in diode is not formed between the source and drain in the case of, e.g., a GaN-based transistor. Therefore, diodes may be connected in positions parallel to the transistors $T_{AC1}$ and $T_{AC2}$ in the same manner as FIG. 5, although the parallel diodes of the transistors $T_{AC1}$ and $T_{AC2}$ are not shown in FIG. 6.

Figure 7:
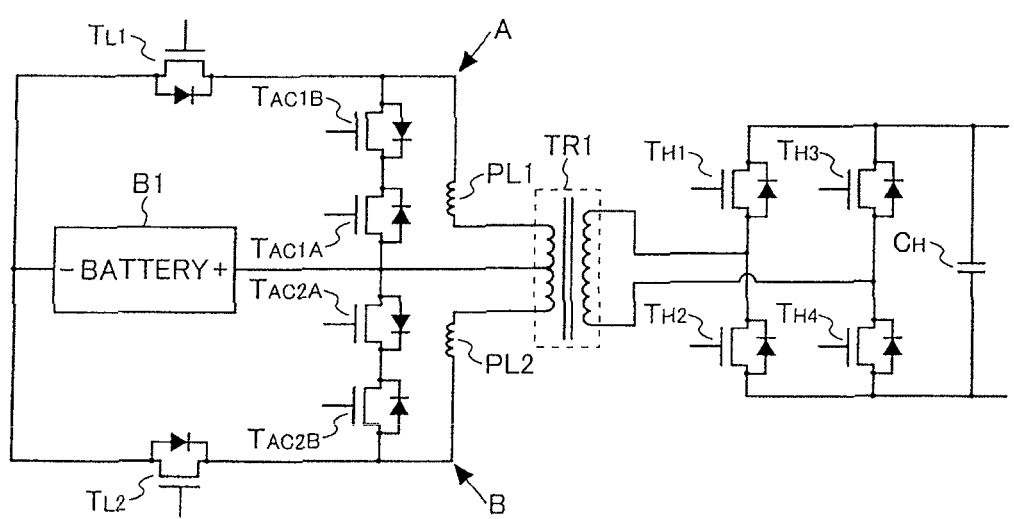
FIG. 7 is a diagram showing the configuration of the push-pull circuit according to a second embodiment of the present invention.

Next, the push-pull circuit according to the second embodiment of the present invention will be described. FIG. 7 shows the configuration of the push-pull circuit according to the second embodiment of the present invention. In FIG. 7, other than changing the transistors $T_{AC1}$ and $T_{AC2}$ in FIG. 1 to transistors $T_{AC1A}$ and $T_{AC2A}$ in FIG. 7, the same reference numerals are used for the same portions in FIG. 1, and a detailed description thereof is omitted.

The push-pull circuit according to the second embodiment of the present invention shown in FIG. 7 has a configuration in which the transistors $T_{AC1B}$ and $T_{AC2B}$ for synchronous rectification are connected in parallel to the diodes $D_{AC1}$ and $D_{AC2}$, respectively, of the push-pull circuit according to the first embodiment of the present invention shown in FIG. 1. However, the diodes $D_{AC1}$ and $D_{AC2}$ may be built-in diodes of the transistors $T_{AC1B}$ and $T_{AC2B}$ for synchronous rectification. It is possible to ensure even greater efficiency because loss attributable to the diode portion can be reduced by performing synchronous rectification.

Figure 8:
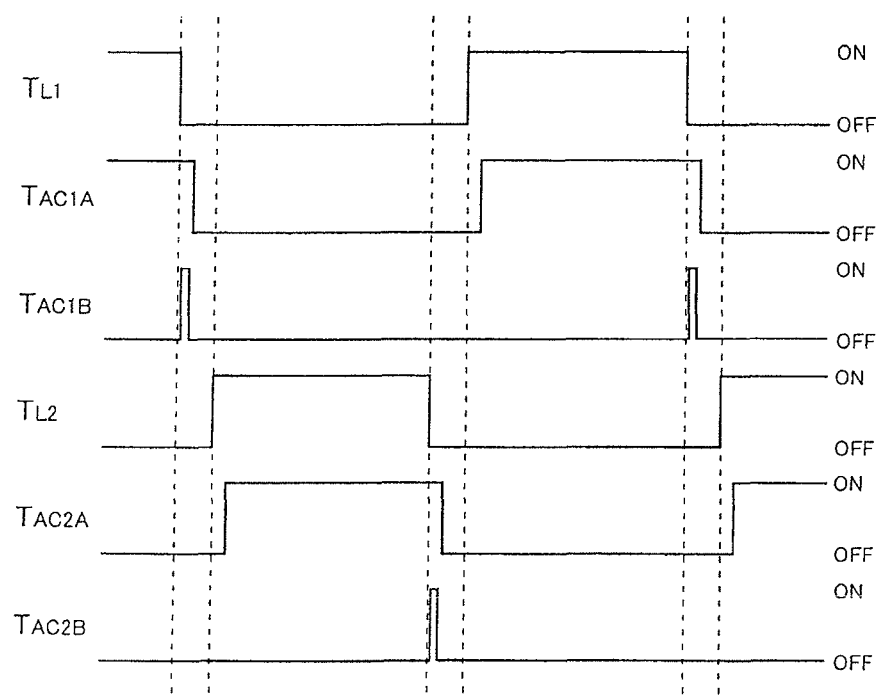
FIG. 8 is a timing chart showing the timing for switching on and off the transistors of the push-pull circuit according to the second embodiment of the present invention.

In the push-pull circuit according to the second embodiment of the present invention shown in FIG. 7, the transistor $T_{AC1B}$ must switch from OFF to ON after the transistor $T_{L1}$ has switched from ON to OFF, the transistor $T_{AC1B}$ must switch from ON to OFF before the transistor $T_{AC1A}$ switches from ON to OFF, the transistor $T_{AC2B}$ must switch from OFF to ON after the transistor $T_{L2}$ has switched from ON to OFF, and the transistor $T_{AC2B}$ must switch from ON to OFF before the transistor $T_{AC2A}$ switches from ON to OFF. Accordingly, the ON and OFF switching of the transistors $T_{L1}$, $T_{L2}$, $T_{AC1A}$, $T_{AC2A}$, $T_{AC1B}$, and $T_{AC2B}$ may be carried out with, e.g., timing such as that shown in FIG. 8.

The example of the power source configuration of the driver for driving the transistors $T_{AC1}$ and $T_{AC2}$ in the push-pull circuit according to the second embodiment of the present invention shown in FIG. 7 is the same as the push-pull circuit according to the first embodiment of the present invention shown in FIG. 1, and a description thereof is omitted here.

Figure 9:
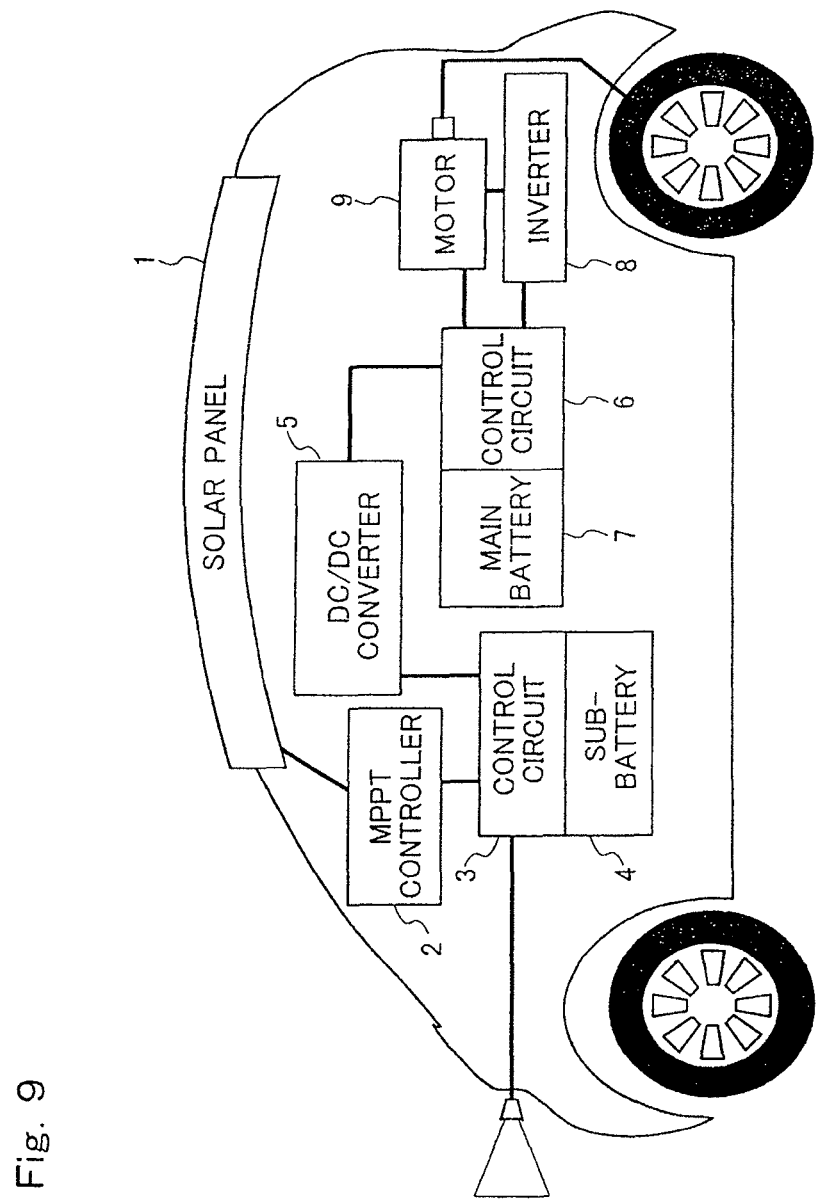
FIG. 9 is a diagram showing an example of the overall configuration of a solar charging system for an electric automobile.

The push-pull circuit according to the present invention can be applied to, e.g., a solar charging system for an electric automobile shown in FIG. 9.

The solar charging system for an electric automobile shown in FIG. 9 comprises a solar panel 1 in which a plurality of solar cells are arranged, a maximum power point tracking (MPPT) controller 2 for controlling the output voltage of the solar panel 1 so that the output voltage of the solar panel 1 is maximized, a control circuit 3 for managing and controlling a sub-battery 4, a sub-battery 4 for storing the output power of the solar panel 1, a DC/DC converter 5 for converting DC voltage outputted from the sub-battery 4 to DC voltage fed to the main battery 7, a control circuit 6 for managing and controlling the main battery 7, and a main battery 7 having a greater capacity than the sub-battery 4. Although not shown in FIG. 9, a circuit for generating control signals for controlling the ON/OFF switching of the switching elements in the DC/DC converter 5 is also provided inside the electric automobile.

In the case that the push-pull circuit according to the present invention is applied to the solar charging system for an electric automobile shown in FIG. 9, the DC/DC converter 5 can be designed to have the push-pull circuit according to the present invention.

An inverter 8 provided to the electric automobile converts DC voltage outputted from the main battery 7 into motor-driving AC voltage. A motor 9 provided to the electric automobile is rotatably driven by the motor-driving AC voltage outputted from the inverter 8. The drive wheels of the electric automobile are rotated by the rotation of the motor 9. Regenerative energy generated by the motor 9 during braking of the electric automobile is recovered by the control circuit 6 and stored in the main battery 7. Also, the DC voltage outputted from the sub-battery 4 is also used as a power source for headlights and the like.

In FIG. 9, the solar charging system provided with the push-pull circuit according to the present invention is a solar charging system for an electric automobile, but may also be used as a solar charging system for other movable bodies (e.g., a motorcycle, or the like).

Next, an example of the configuration of the DC/DC converter 5 will be described.

Figure 10:
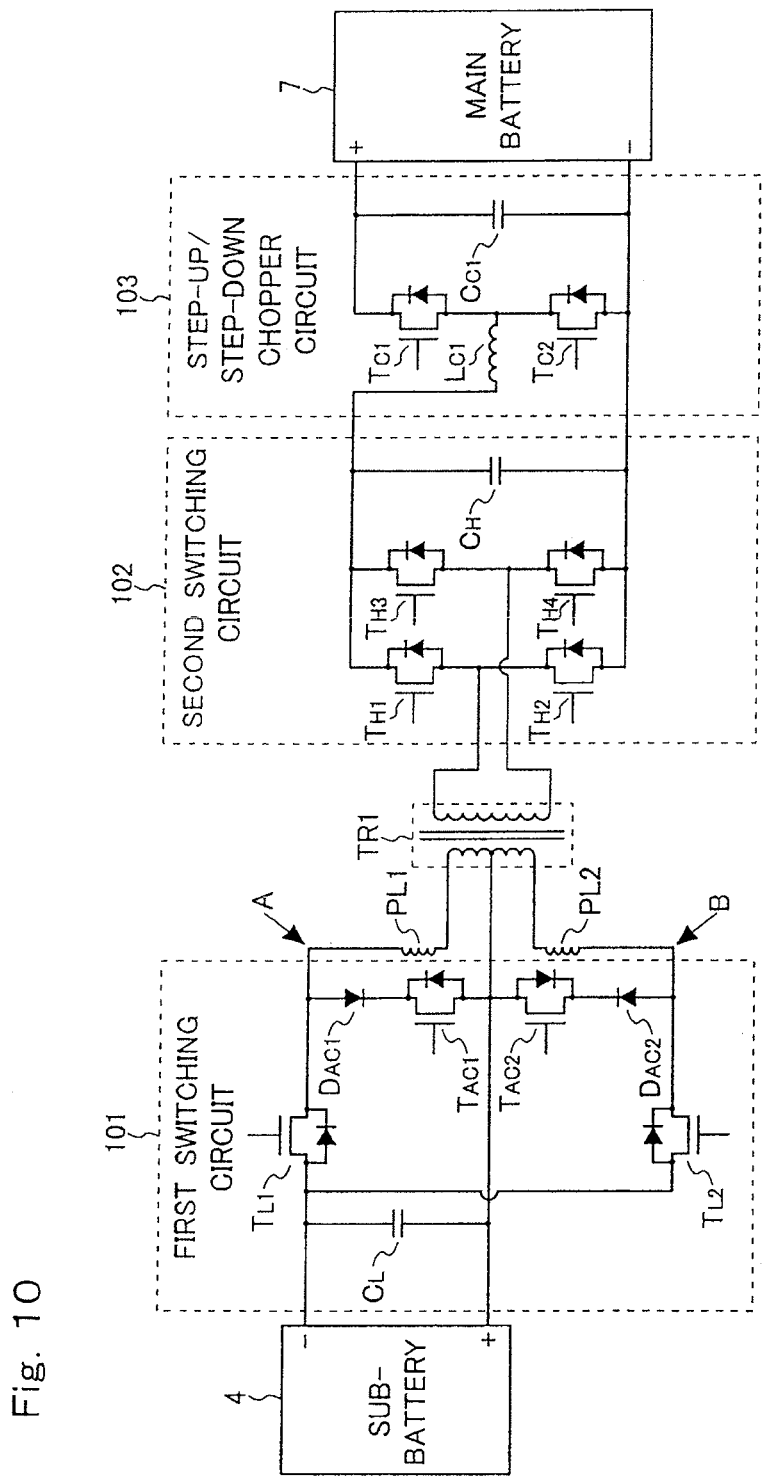
FIG. 10 is a diagram showing an example of a configuration of a DC/DC converter used in a solar charging system for an electric automobile.

FIG. 10 shows an example of the configuration of the DC/DC converter 5. In the configuration example shown in FIG. 10, the DC/DC converter 5 comprises a first switching circuit 101, a transformer TR1, a second switching circuit 102, and a step-up/step-down chopper circuit 103. The arrangement of the DC/DC converter composed of the first switching circuit 101, the transformer TR1, and the second switching circuit 102, and the DC/DC converter composed of the step-up/step-down chopper circuit 103 may be reversed. Also, in order to constantly maintain high efficiency in accordance with the various states of the voltages of the sub-battery 4 and the main battery 7, it is preferred that the DC/DC converter composed of the first switching circuit 101, the transformer TR1, and the second switching circuit 102 be made to operate on the basis of a fixed duty, and that the DC/DC converter composed of the step-up/step-down chopper circuit 103 be made to operate on the basis of a variable duty, to control the step up/step down voltage ratio, whereby the DC/DC converter 5 can be made into a variable factor DC/DC converter for controlling the conversion factor using the duty of the step-up/step-down chopper circuit 103. However, it is possible to exclude the step-up/step-down chopper circuit 103 and to use only a DC/DC converter composed of the first switching circuit 101, the transformer TR1, and the second switching circuit 102

The step-up/step-down chopper circuit 103 is composed of transistors $T_{C1}$ and $T_{C2}$, which are N-channel MOSFETs, an inductor $L_{C1}$, and a capacitor $C_{C1}$. The transistor $T_{C1}$ operates as a synchronous rectifier element when charging is carried out from the sub-battery 4 to the main battery 7, and the transistor $T_{C2}$ operates as a synchronous rectifier element when charging is carried out from the main battery 7 to the sub-battery 4. However, it is possible to keep the synchronous rectifier elements in an OFF state and operate only the diodes connected in parallel (parasitic) with the synchronous rectifier elements.

The first switching circuit 101 is composed of the push-pull circuit according to the present invention, and a capacitor $C_L$, which functions as a smoothing capacitor when charging from the main battery 7 to the sub-battery 4. In FIG. 10, the push-pull circuit of the first embodiment of the present invention is shown as the push-pull circuit according to the present invention, but it is also possible to use another push-pull circuit according to the present invention.

Described below is a advantageous configuration example of a bidirectional converter composed of the first switching circuit 101, the transformer TR1, and the second switching circuit 102.

Figure 11:
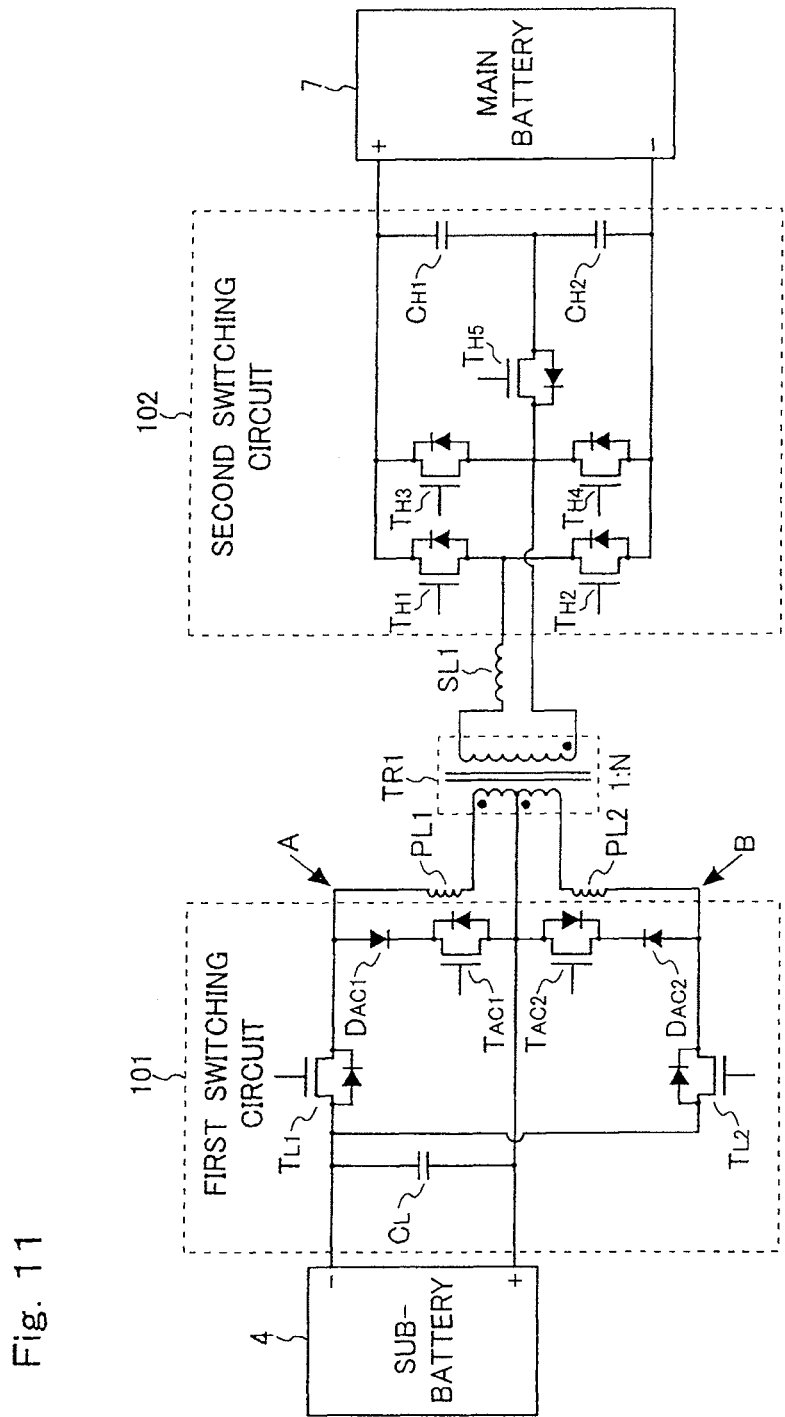
FIG. 11 is a diagram showing the configuration of a bidirectional DC/DC converter according to a first advantageous configuration example.

FIG. 11 is a diagram showing the configuration of a bidirectional DC/DC converter according to a first advantageous configuration example. The bidirectional DC/DC converter according to the first advantageous configuration example shown in FIG. 11 comprises: a first switching circuit 101; a transformer TR1 having a winding ratio (the winding ratio between the low-voltage winding and the high-voltage winding) of 1:N; a full-bridge circuit connected to the high-voltage winding of the transformer TR1, the full-bridge circuit being composed of transistors $T_{H1}$ to $T_{H4}$, which are N-channel MOSFETs; and a second switching circuit 102 having a transistor $T_{H5}$, which is an N-channel MOSFET, and capacitors $C_{H1}$ and $C_{H2}$, provided between the full-bridge circuit and the main battery 7.

The source of the transistor $T_{H1}$ and the drain of the transistor $T_{H2}$ are connected to one end of the high-voltage winding of the transformer TR1; and the source of the transistor $T_{H3}$, the drain of the transistor $T_{H4}$, and the drain of the transistor $T_{H5}$ are connected to the other end of the high-voltage winding of the transformer TR1. The drain of the transistor $T_{H1}$ and the drain of the transistor $T_{H3}$, and one end of the capacitor $C_{H1}$ are connected to the positive pole of the main battery 7; and the source of the transistor $T_{H2}$ and the source of the transistor $T_{H4}$, and one end of the capacitor $C_{H2}$ are connected to the negative pole of the main battery 7. The other end of the capacitor $C_{H1}$ and the other end of the capacitor $C_{H2}$ are connected to the source of the transistor $T_{H3}$. The diodes between the source and drain of the transistors are parallel transistors. The main battery 7 is a battery having higher voltage than the sub-battery 4. Also, the inductors PL1, PL2, SL1 are parasitic inductors of the transformer TR1. However, the inductor SL1 may include an external inductor (other than the parasitic inductors of the transformer TR1) connected to the transformer TR1. In this case, the control range of the output voltage can be varied by adjusting the inductance of the inductor SL1. Similarly, the control range of the output voltage can be varied by connecting the external inductor to the inductors PL1, PL2, but such is not preferred in that there is a further increase in the energy of the surge generated when the transistors $T_{L1}$, $T_{L2}$ are set to OFF. On the other hand, the electric current that flows through the inductor SL1 positioned on the high-voltage side is less subject to the surge because the electric current becomes relatively low. In other words, in the case that an inductor is added in order vary the control range of the output voltage, the inductor is preferably added to the inductor SL1.

The bidirectional DC/DC converter according to the first advantageous configuration example shown in FIG. 11 carries out DC/DC conversion by keeping the transistor $T_{H5}$ constantly ON during step-up operation, converting the DC voltage outputted from the sub-battery 4 into AC voltage using the first switching circuit 101, stepping up the voltage using the transformer TR1, and then performing rectification using the voltage-doubling rectification circuit composed of the transistors $T_{H1}$ and $T_{H2}$, the transistor $T_{H5}$, and the capacitors $C_{H1}$ and $C_{H2}$. Since the winding ratio (the winding ratio between the low-voltage winding and the high-voltage winding) of the transformer TR1 is 1:N, the fixed step-up factor in the bidirectional DC/DC converter according to the first advantageous configuration example is a factor of 2N (excluding the voltage change brought about by the inductors PL1, PL2, SL1). The duty of the gate-driving voltage of the transistors $T_{L1}$ and $T_{L2}$ is varied, whereby the rate of variation (di/dt; >0) of the electric current i that flows to the parasitic inductors is made to vary, and the output voltage and output electric current can be controlled.

The bidirectional DC/DC converter according to the first advantageous configuration example shown in FIG. 11 carries out DC/DC conversion by keeping the transistor $T_{H5}$ constantly OFF during step-down operation, converting the DC voltage outputted from the main battery 7 into AC voltage using the second switching circuit 102, stepping down the voltage using the transformer TR1, performing rectification using the transistors $T_{L1}$ and $T_{L2}$, and then feeds the DC/DC-converted voltage to the sub-battery 4. Since the winding ratio (winding ratio between the high-voltage winding and the low-voltage winding) of the transformer TR1 is 1:N, the fixed step-down factor in the bidirectional DC/DC converter according to the first advantageous configuration example is a factor of 1/N (excluding the effect of the parasitic inductors). The duty of the gate-driving voltage of the transistors $T_{H1}$, $T_{H2}$, $T_{H3}$, $T_{H4}$ is varied, whereby the rate of variation (di/dt; >0) of the electric current i that flows to the parasitic inductors is made to vary, and the output voltage and output electric current can be controlled.

The reason that the fixed step-up factor of the bidirectional DC/DC converter according to the preferred configuration is greater than the inverse of the fixed step-down factor is next described.

For example, let Vsub be the voltage of the sub-battery 4, Vsub_min (minimum) to Vsub_max (maximum) be the voltage range thereof, Vmain be the voltage of the main battery 7, Vmain_min (minimum) to Vmain_max (maximum) be the voltage range thereof, α be the fixed step-up factor that does not depend on the duty determined by the low-voltage winding, the high-voltage winding, and the like of the transformer, 1/β be the fixed step-down factor that does not depend on the duty determined by the winding ratio and the like of the transformer, L be the inductance (disposed on the high-voltage side of the transformer) equivalent to the entire parasitic inductance of the transformer (including external inductance connected to the transformer), and I be the electric current that flows to the high-voltage winding of the transformer.

In this case, the expression Vmain=αVsub−L(dI/dt) holds true in the step-up operation. Since switching loss is reduced, the ratio (dI/dt) is a positive value when one of the transistors $T_{L1}$, $T_{L2}$ is in an ON state in the case that the switching of the transistors $T_{L1}$, $T_{L2}$ is set to zero electric current switching (or switching at an electric current value that is sufficiently low). Therefore, the expression Vmain=αVsub−L(dI/dt) <αVsub holds true. The fixed step-up factor (e.g., the winding ratio of the transformer) must be selected so that $$Vmain\_max < \alpha Vsub\_min \quad \text{(Formula 1)}$$

with consideration given to the voltage ranges of the sub-battery 4 and the main battery 7.

Next, the expression Vsub=(1/β){Vmain−L(dI/dt)} holds true in the step-down operation. The ratio (dI/dt) is a positive value when the transistors $T_{H1}$ and $T_{H4}$ are in an ON state (OFF state) and the transistors $T_{H2}$, $T_{H3}$ are in an OFF state (ON state) in the case that, among the switching of the transistors $T_{H1}$, $T_{H2}$, $T_{H3}$, $T_{H4}$, the switching for inverting the direction of the voltage generated between the transformer terminals is set to zero electric current switching (or switching at an electric current value that is sufficiently low) for the purpose of reducing switching loss. Therefore, the expression Vsub=(1/β) {Vmain−L(dI/dt)}<(1β) Vmain holds true. The fixed step-down factor (e.g., the winding ratio of the transformer) must be selected so that $$V\text{sub}\_max < (1/\beta) V\text{main}\_min \quad \text{(Formula 2)}$$

with consideration given to the voltage ranges of the sub-battery 4 and the main battery 7.

In the bidirectional DC/DC converter, the formulas 1 and 2 must be simultaneously satisfied. Therefore, the following holds true from the formulas 1 and 2, $$V\text{sub}\_max < (1/\beta) V\text{main}\_min < (\alpha/\beta) V\text{sub}\_min \therefore (\alpha/\beta) > (V\text{sub}\_max/V\text{sub}\_min) > 1 \quad \text{(Formula 3)}.$$

Therefore, the winding ratio of the transformer during step-up is 1:α, the winding ratio of the transformer during step-down is 1:β (<α), and winding ratios that are different during step-up and during step-down must be used when the fixed step-up factor α and the fixed step-down factor (1/β) are determined only by the winding ratio of the transformer, making the circuit configuration very complicated. On the other hand, in the circuit of FIG. 11, the winding ratio of the transformer TR1 is 1:N, which accordingly corresponds to the case in which α=2N and β=N, and Formula 3 is satisfied. In other words, in the circuit of FIG. 11, the winding ratio of the transformer is not required to be changed during step-up and during step-down. It is therefore possible to configure a bidirectional DC/DC converter using a simple circuit configuration.

Figure 12:
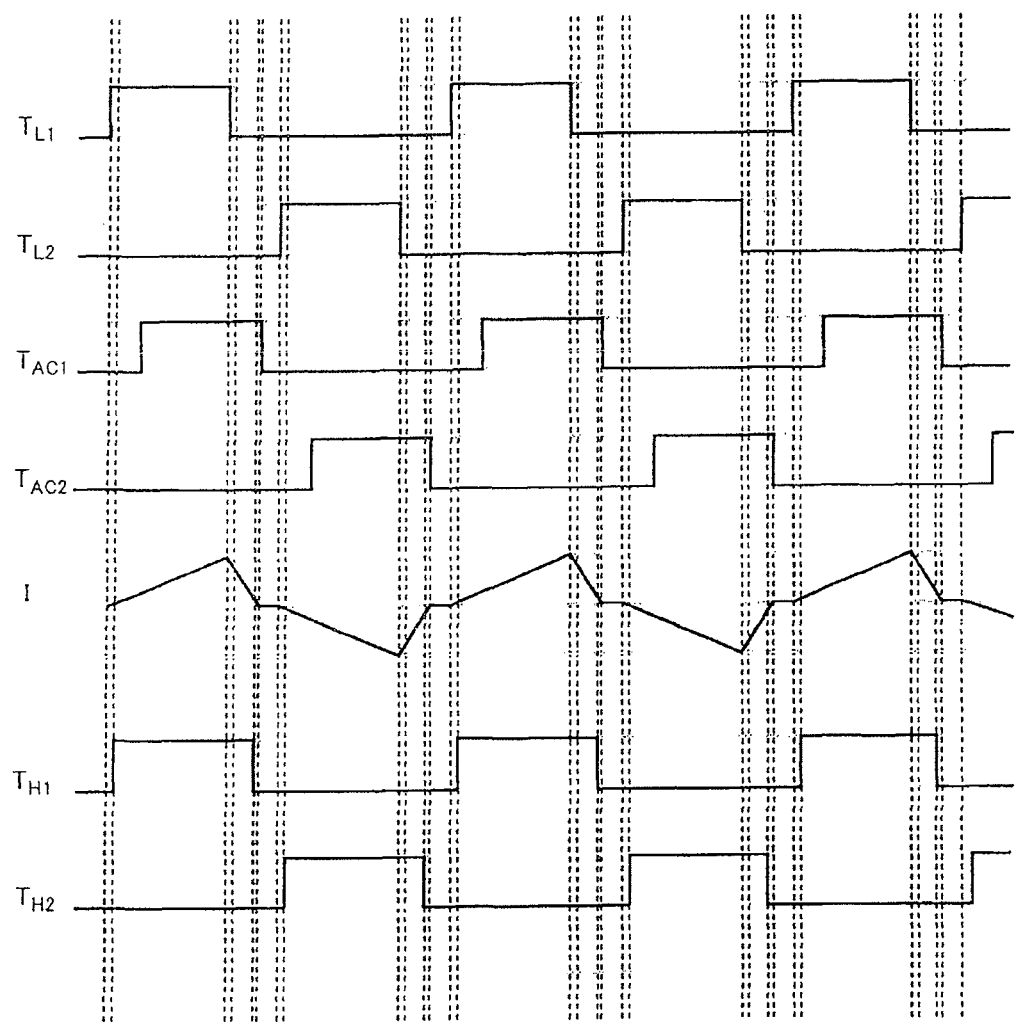
FIG. 12 is a timing chart showing the timing for switching on and off the transistors of the bidirectional DC/DC converter according to the first advantageous configuration example in step-up operation.

Next, FIG. 12 shows a timing chart of the timing of the ON, OFF switching of the transistors of the bidirectional DC/DC converter according to the first advantageous configuration example during step-up operation. The transistors $T_{H3}$, $T_{H4}$ are constantly OFF, and the transistor $T_{H5}$ is constantly ON.

Figure 13:
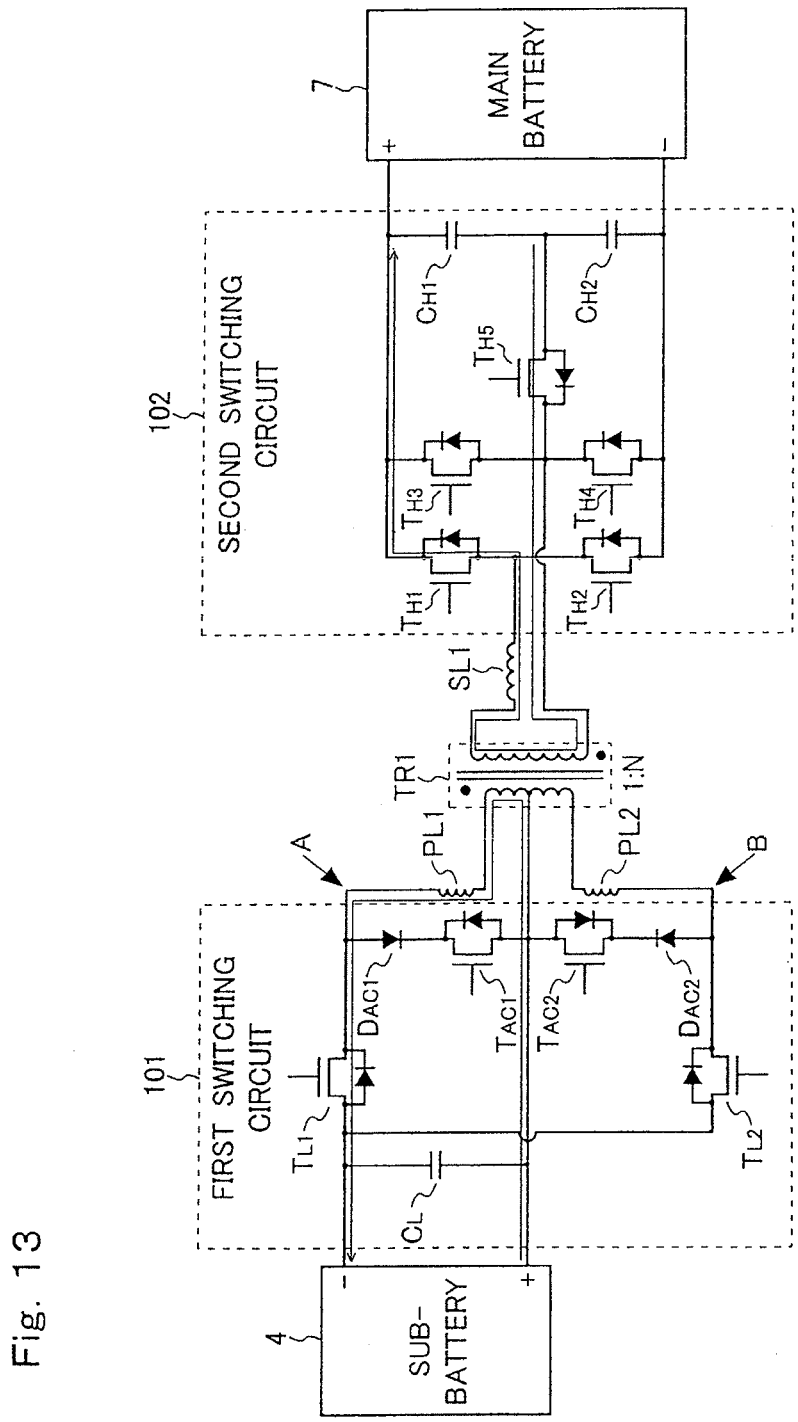
FIG. 13 is a diagram showing the electric current pathway of the bidirectional DC/DC converter according to the first advantageous configuration example in step-up operation.

(U-1) When the transistor $T_{L1}$ is set to ON and the voltage of the sub-battery 4 is applied to the low-voltage winding of the transformer TR1, an electromotive force is generated in the high-voltage winding of the transformer TR1 and an electric current flows through the transistor $T_{H5}$ and the transistor $T_{H1}$ (see FIG. 13). At this time, the transistor $T_{H1}$ is set to ON in conjunction with the timing at which the electric current flows to the parallel diode of the transistor $T_{H1}$, and synchronous rectification is performed, thereby making it possible to reduce loss attributable to the diode portion. In this case, the transistor $T_{H1}$ is preferably set to ON after the transistor $T_{L1}$ has been set to ON.

(U-2) Next, the transistor $T_{AC1}$ is set to ON.

(U-3) Next, the transistor $T_{L1}$ is set to OFF. At this time, the electric potential of the connecting point A increases due to the electromotive force generated in the parasitic inductors PL1 and SL1 of the transformer TR1, and a return electric current flows via the pathway: the transformer TR1, the inductor PL1, the connecting point A, the diode $D_{AC1}$, the transistor $T_{AC1}$, and the transformer TR1. The energy accumulated in the inductors PL1 and SL1 is transferred to the capacitor $C_{H1}$ or the main battery 7 without an excessive surge voltage being generated. Therefore, it is possible to obtain high efficiency while circuit destruction is prevented.

(U-4) Next, the transistor $T_{H1}$ is set to OFF with timing at which the return electric current is zero or sufficiently low, and the transistor $T_{AC1}$ is subsequently set to OFF.

(U-5) Next, the direction of the voltage between the terminals of the transformer TR1 is inverted, after which the transistor $T_{L2}$ is set to ON and the voltage of the sub-battery 4 is applied to the low-voltage winding of the transformer TR1, whereupon an electromotive force is generated in the high-voltage winding of the transformer TR1 and electric current flows through the transistors $T_{H5}$ and $T_{H2}$ (see FIG. 13). At this time, the transistor $T_{H2}$ is set to ON in conjunction with the timing at which the electric current flows to the parallel diode of the transistor $T_{H2}$, and synchronous rectification is performed, thereby making it possible to reduce loss attributable to the diode portion. In this case, the transistor $T_{H2}$ is preferably set to ON after the transistor $T_{L2}$ has been set to ON.

(U-6) Next, the transistor $T_{AC2}$ is set to ON.

(U-7) Next, the transistor $T_{L2}$ is set to OFF. At this time, the electric potential of the connecting point B increases due to the electromotive force generated in the parasitic inductors PL2 and SL1 of the transformer TR1, and a return electric current flows via the pathway: the transformer TR1, the inductor PL2, the connecting point B, the diode $D_{AC2}$, the transistor $T_{AC2}$, and the transformer TR1. The energy accumulated in the inductors PL2 and SL1 is transferred to the capacitor $C_{H2}$ without an excessive surge voltage being generated. Therefore, it is possible to obtain high efficiency while circuit destruction is prevented.

(U-8) Next, the transistor $T_{H2}$ is set to OFF with timing at which the return electric current is zero or sufficiently low, and the transistor $T_{AC2}$ is subsequently set to OFF.

(U-1) to (U-8) described above are thereafter repeated.

Figure 14:
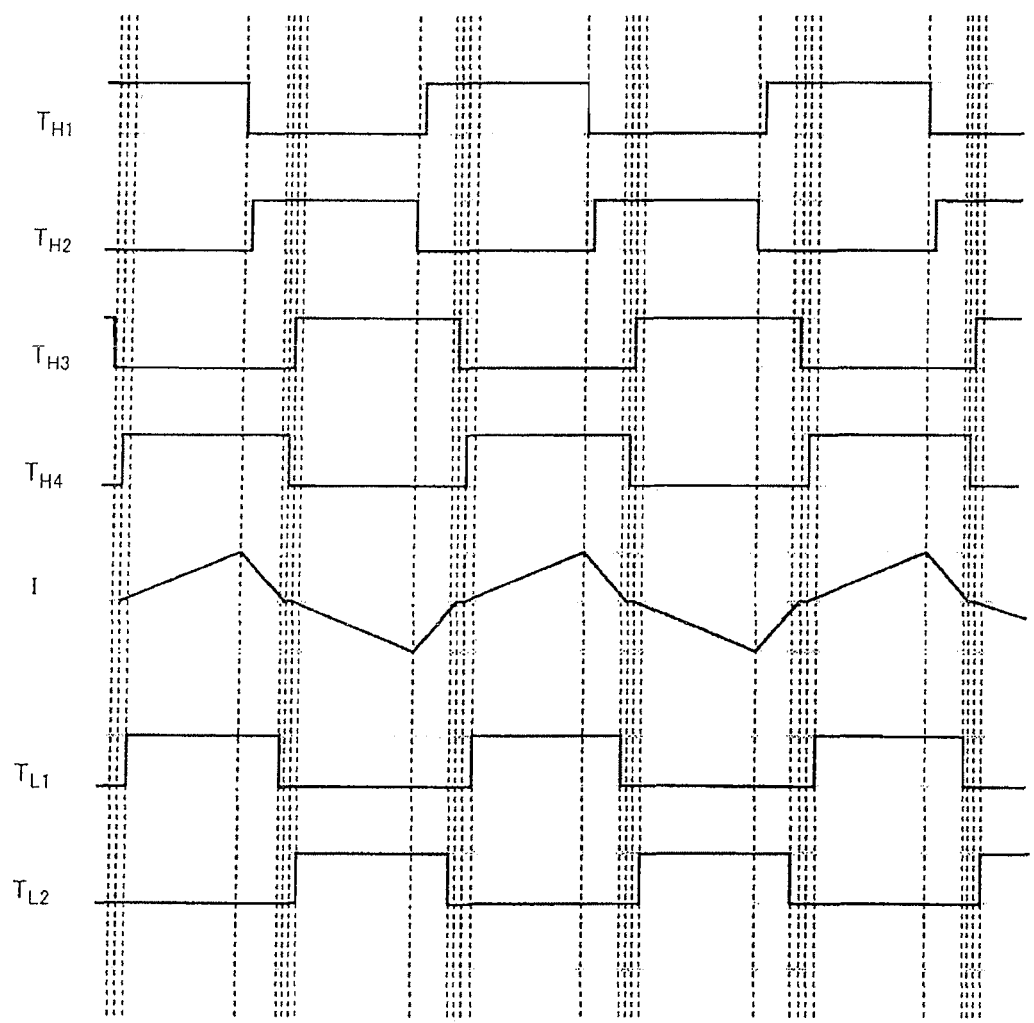
FIG. 14 is a timing chart showing the timing for switching on and off the transistors of the bidirectional DC/DC converter according to the first advantageous configuration example in step-down operation.

Next, FIG. 14 shows a timing chart of the timing of the ON, OFF switching of the transistors of the bidirectional DC/DC converter according to the first advantageous configuration example during step-down operation. The transistor $T_{H5}$ is constantly OFF.

Figure 15:
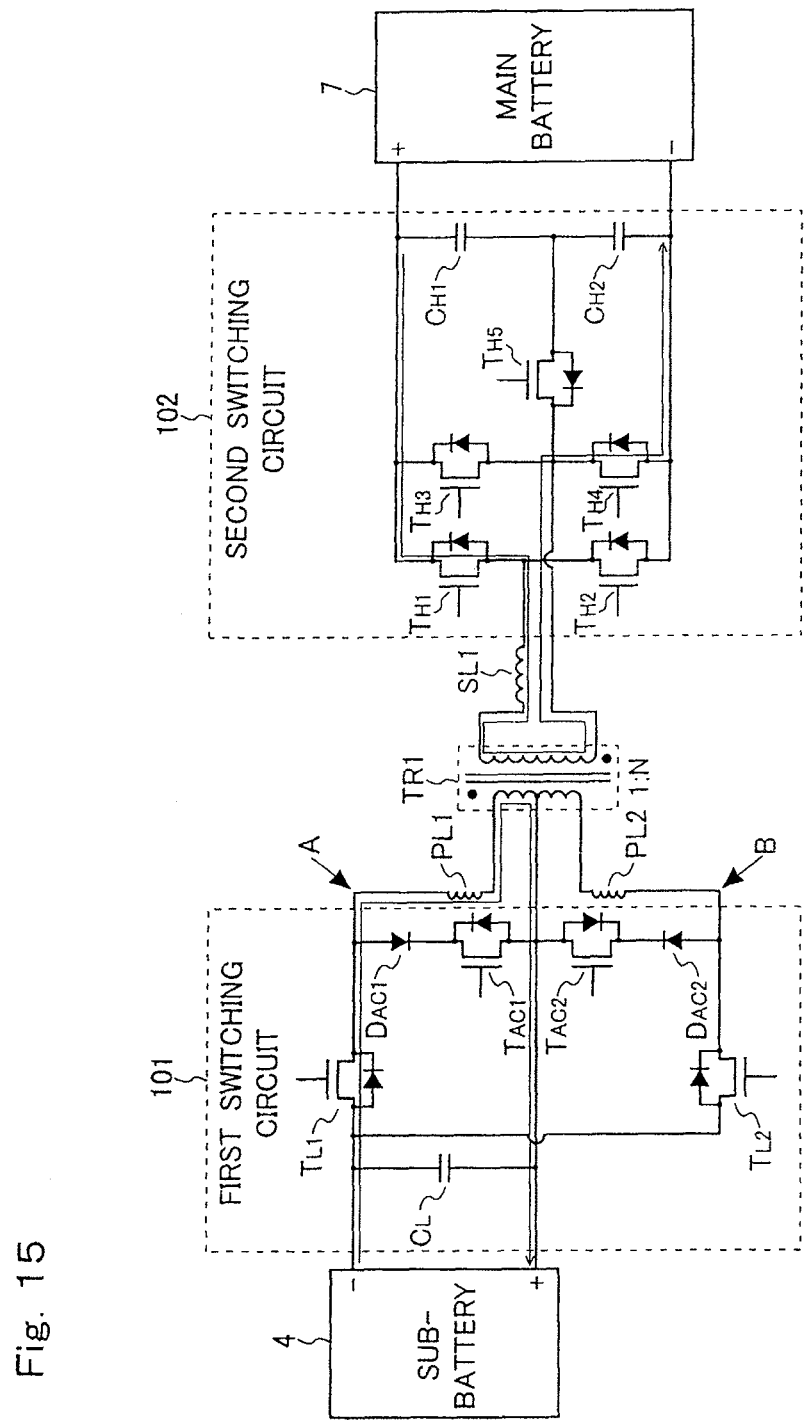
FIG. 15 is a diagram showing the electric current pathway of the bidirectional DC/DC converter according to the first advantageous configuration example in step-down operation.

(D-1) When the transistor $T_{H1}$ is set to ON with the transistor $T_{H4}$ in an ON state, and the voltage of the main battery 7 is applied to the high-voltage winding of the transformer TR1, an electromotive force is generated in the low-voltage winding of the transformer TR1 and an electric current flows through the transistor $T_{L1}$ (see FIG. 15). At this time, the transistor $T_{L1}$ is set to ON in conjunction with the timing at which the electric current flows to the parallel diode of the transistor $T_{L1}$, and synchronous rectification is performed, thereby making it possible to reduce loss attributable to the diode portion.

(D-2) Next, the transistor $T_{H4}$ is set to OFF, and the transistor $T_{H3}$ is subsequently set to ON, whereby electric current is made to flow back via the pathway: the transistor $T_{H1}$, the transformer TR1, the transistor $T_{H3}$, and the transistor $T_{H1}$. The energy accumulated in the parasitic inductors of the transformer TR1 is thereby transferred to the low-voltage side (sub-battery 4). Electric current flows to the parallel diode of the transistor $T_{H3}$ in the period of time from the transistor $T_{H4}$ being set to OFF to the transistor $T_{H3}$ being set to ON.

(D-3) Next, the transistor $T_{L1}$ and the transistor $T_{H1}$ are set to OFF with timing at which the return electric current has become zero or sufficiently low (ZCS: zero electric current switching). The transistor $T_{L1}$ is preferably set to OFF before the transistor $T_{H1}$ is set to OFF.

(D-4) Thereafter, the direction of the voltage between the terminals of the transformer TR1 is inverted, after which the transistor $T_{H2}$ is set to ON (ZVS: zero voltage switching) and the voltage of the main battery 7 is applied to the high-voltage winding of the transformer TR1, whereby an electromotive force is generated in the low-voltage winding of the transformer TR1 and electric current flows through the transistor $T_{L2}$ (or the parallel diode). At this time, the transistor $T_{L2}$ is set to ON in conjunction with the timing at which the electric current flows to the parallel diode of the transistor $T_{L2}$ (ZVS), and synchronous rectification is performed, whereby loss attributable to the diode portion is reduced. In this case, the transistor $T_{L2}$ is preferably set to ON after the transistor $T_{H2}$ has been set to ON.

(D-5) Next, the transistor $T_{H3}$ is set to OFF (ZVS), and the transistor $T_{H4}$ is subsequently set to ON (ZVS), whereby the electric current flows via the pathway: the transistor $T_{H2}$, the transformer TR1, the transistor $T_{H4}$, and the transistor $T_{H2}$. The energy accumulated in the parasitic inductors of the transformer TR1 is thereby transferred to the low-voltage side. Electric current flows to the parallel diode of the transistor $T_{H4}$ in the period of time from the transistor $T_{H3}$ being set to OFF to the transistor $T_{H4}$ being set to ON.

(D-6) Next, the transistor $T_{L2}$ and the transistor $T_{H2}$ are set to OFF with timing at which the return electric current has become zero or sufficiently low (ZCS). The transistor $T_{L2}$ is preferably set to OFF before the transistor $T_{H2}$ is set to OFF.

(D-7) Thereafter, the direction of the voltage between the terminals of the transformer TR1 is inverted, after which the transistor $T_{H1}$ is set to ON (ZVS) and the voltage of the main battery 7 is applied to the high-voltage winding of the transformer TR1, whereby an electromotive force is generated in the low-voltage winding of the transformer TR1 and electric current flows through the transistor $T_{L1}$ (or the parallel diode). At this time, the transistor $T_{L1}$ is set to ON (ZVS) in conjunction with the timing at which the electric current flows to the parallel diode of the transistor $T_{L1}$, and synchronous rectification is performed, whereby loss attributable to the diode portion is reduced. In this case, the transistor $T_{L1}$ is preferably set to ON after the transistor $T_{H1}$ has been set to ON.

(D-2) to (D-8) described above are thereafter repeated.

All switching is ZVS or ZCS soft switching, and loss can be reduced while the occurrence of surge voltage or the like is inhibited.

The interval in which the transistors $T_{H1}$ and $T_{H4}$ are set to ON, and the interval in which the transistors $T_{H2}$ and $T_{H3}$ are set to ON are repeated in alternating fashion, but a large short-circuit electric current flows when the transistors $T_{H1}$ and $T_{H2}$ are simultaneously set to ON, and a large short-circuit electric current flows when the transistors $T_{H3}$ and $T_{H4}$ are simultaneously set to ON. Therefore, an interval (dead time) in which the transistors $T_{H1}$ to $T_{H4}$ are set to OFF is provided in order to prevent the transistors $T_{H1}$ and $T_{H2}$ from being simultaneously ON and the transistors $T_{H3}$ and $T_{H4}$ from being simultaneously ON. It is thereby possible to ensure even greater efficiency.

In the case that the transistor $T_{H5}$ is configured using a single MOS transistor in the same manner as the bidirectional DC/DC converter according to the first advantageous configuration example, the capacitor $C_{H2}$ short circuits via the transistor $T_{H4}$ and the built-in diode of the transistor $T_{H5}$; a large short-circuit electric current flows; and the capacitor $C_{H2}$, the transistor $T_{H4}$, and the transistor $T_{H5}$ are damaged when the transistor $T_{H4}$ has been set to ON in a state in which the capacitor $C_{H2}$ has been charged during, e.g., the start of step-down operation.

Figure 16:
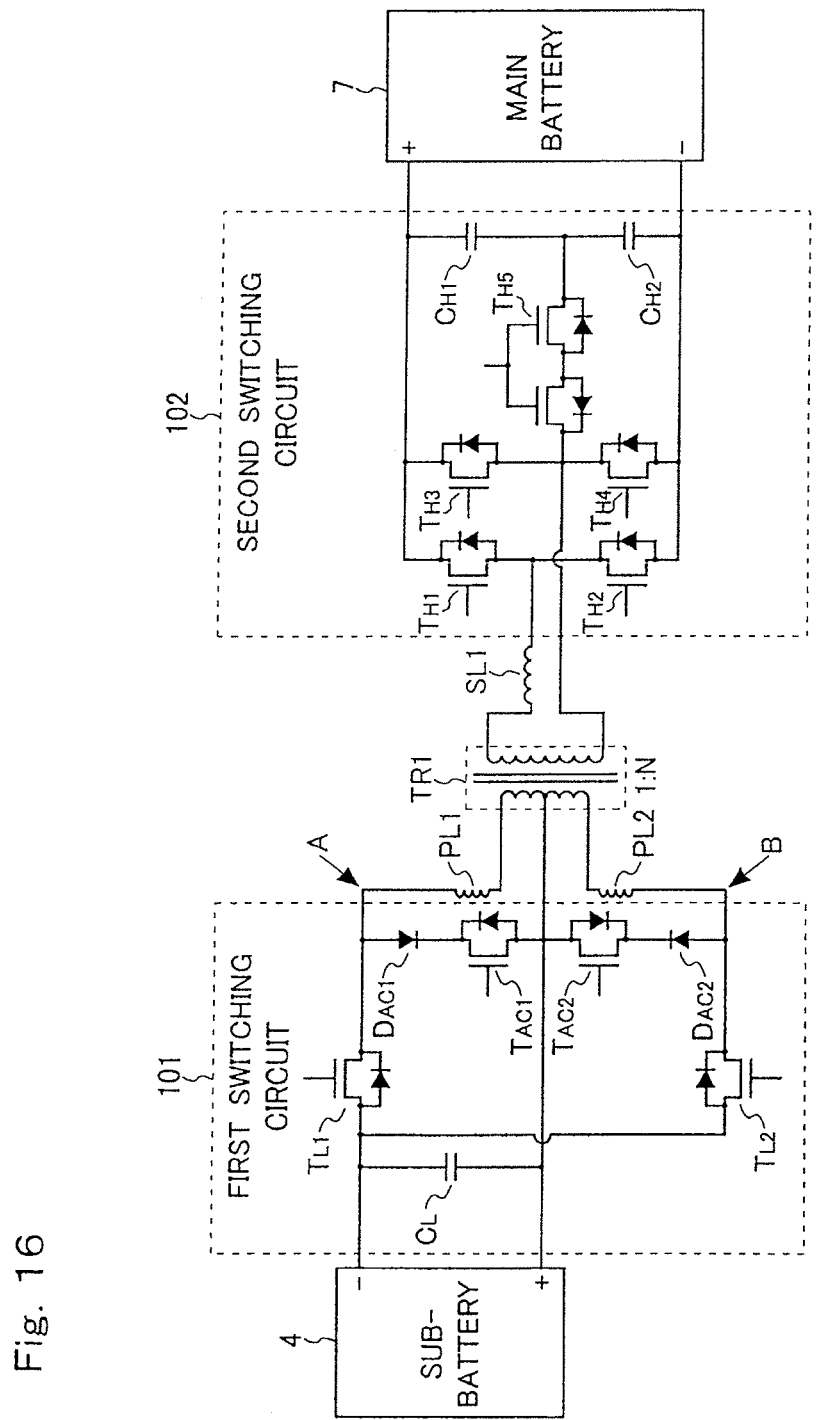
FIG. 16 is a diagram showing the configuration of a bidirectional DC/DC converter according to a second advantageous configuration example.
Figure 17:
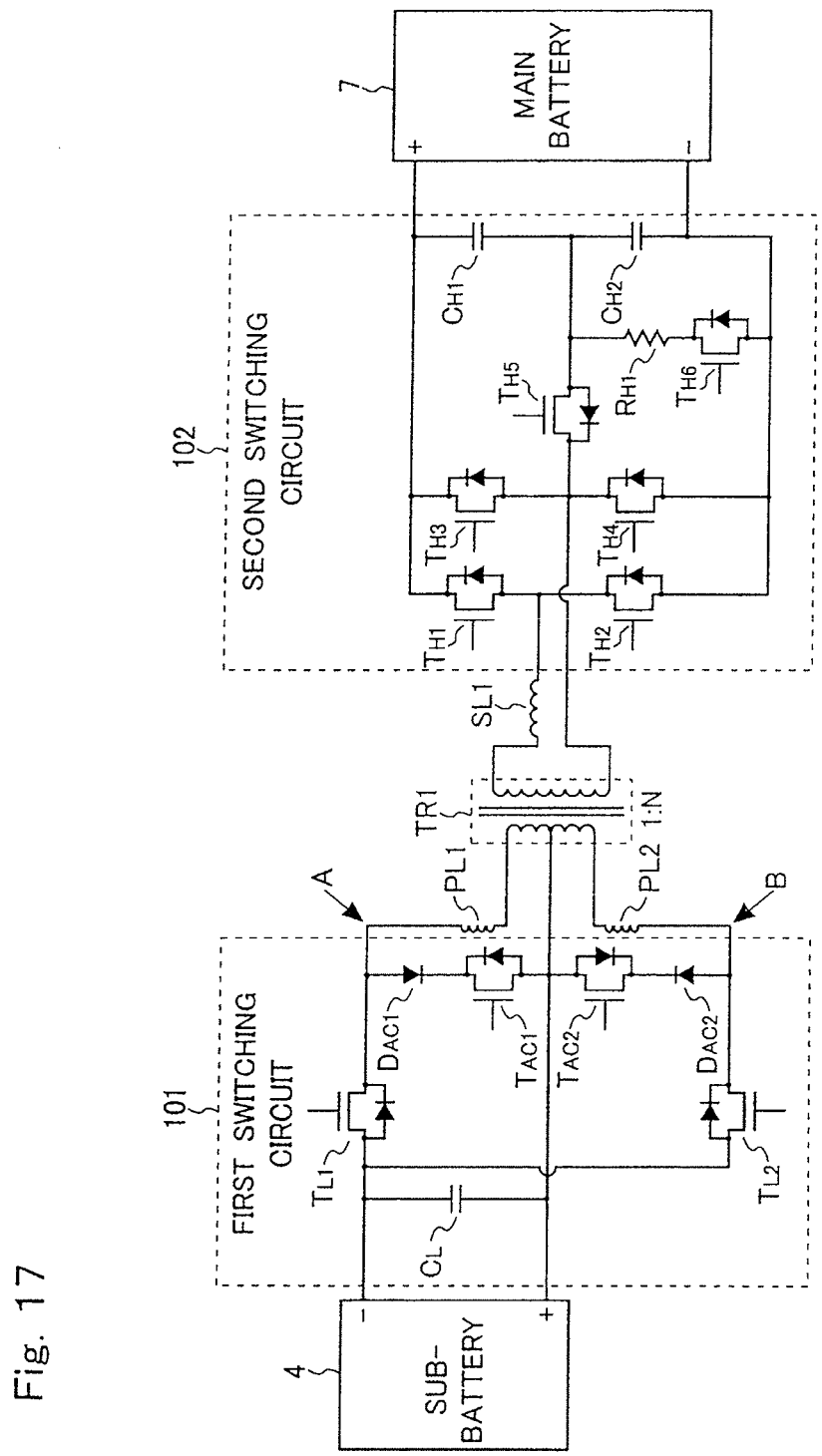
FIG. 17 is a diagram showing the configuration of a bidirectional DC/DC converter according to a third advantageous configuration example.

In view of the above, preferably used is a configuration of, e.g., the bidirectional DC/DC converter according to a second advantageous configuration example shown in FIG. 16; or the bidirectional DC/DC converter according to a third advantageous configuration example shown in FIG. 17. In FIGS. 16 and 17, the same reference numerals are used for the same portions in FIG. 11, and a detailed description thereof is omitted.

In the bidirectional DC/DC converter according to the second advantageous configuration example shown in FIG. 16, the transistor $T_{H5}$ is composed of two N-channel MOSFETs in which the sources are connected to each other and a shared gate control signal is fed to the gates. The capacitor $C_{H2}$ thereby no longer short circuits via the built-in diode of the transistor $T_{H5}$ and the transistor $T_{H4}$, even when the transistor $T_{H4}$ has been set to ON.

In the bidirectional DC/DC converter according to the third advantageous configuration example shown in FIG. 17, a discharge circuit composed of a resistance $R_{H1}$ and a transistor $T_{H6}$ is provided in parallel to the capacitor $C_{H2}$. Before the transistor $T_{H4}$ is set to ON in the initial state of step-down operation, the transistor $T_{H6}$ is set to ON and discharging is carried out via the resistance $R_{H1}$ until the voltage at the two ends of the capacitor $C_{H2}$ is substantially 0 V, after which the transistor $T_{H6}$ is set to OFF and the transistor $T_{H4}$ is then set to ON. As a consequence, a large short-circuit electric current no longer flows even when the transistor $T_{H4}$ has been set to ON and the capacitor $C_{H2}$ short circuits via the transistor $T_{H4}$ and the built-in diode of the transistor $T_{H5}$.

Described next is a bidirectional DC/DC converter according to a fourth advantageous configuration example shown in FIG. 18. The bidirectional DC/DC converter according to a fourth advantageous configuration example shown in FIG. 18 features the use of a normally-on device.

GaN-based transistors, SiC-based transistors, and other compound power devices feature low gate capacity and low on-resistance, and consequently have high expectations as next generation power devices that will replace Si-based power devices. It is difficult to form P-type active layers having low resistance using these compound power devices, and therefore, under current conditions, normally-on N-type devices are generally used. In the case that a normally-on device is used, it is highly likely that the normally-on device will be in an ON state when the driver for driving the normally-on device has failed. Therefore, it is necessary to ensure that short-circuiting or the like does not occur when the driver for driving the normally-on device has failed.

Figure 18:
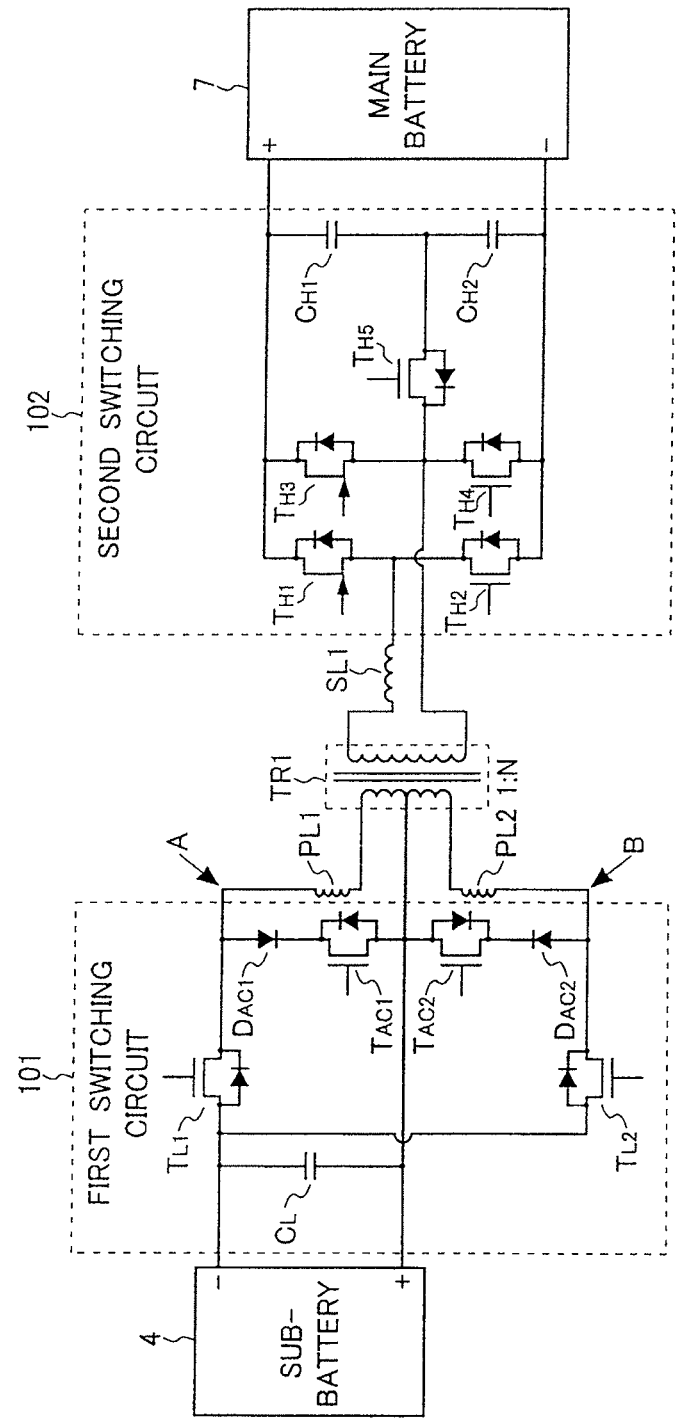
FIG. 18 is a diagram showing the configuration of a bidirectional DC/DC converter according to a fourth advantageous configuration example.
Figure 19:
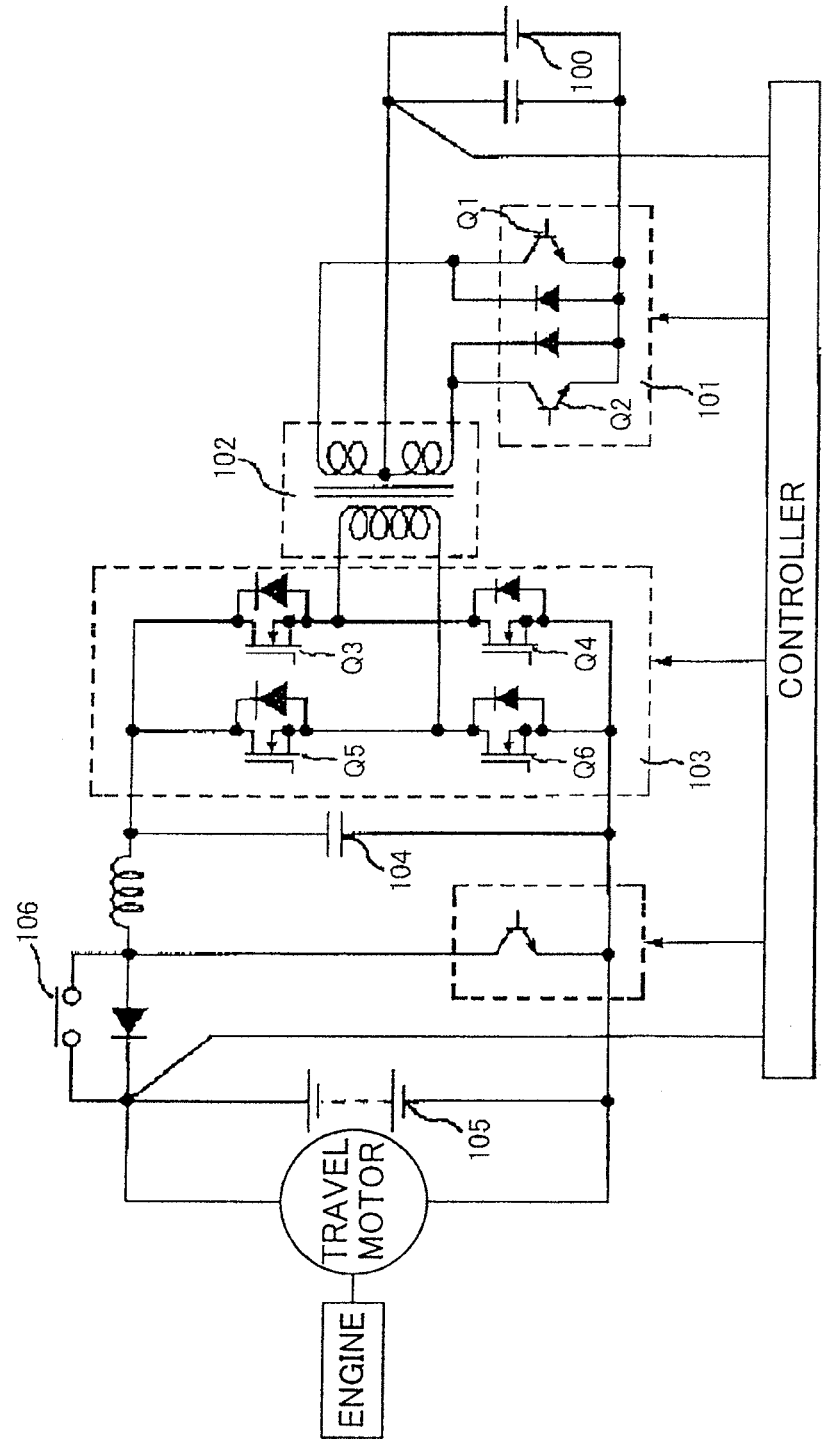
FIG. 19 is a diagram showing the configuration of the power source device disclosed in Japanese Laid-open Patent Application No. 2000-50402.

In view of the above, in the bidirectional DC/DC converter according to a fourth advantageous configuration example shown in FIG. 18, normally-on devices are used as the transistors $T_H$ and $T_{H3}$. It is therefore possible to achieve a reduction in switching loss due to low gate capacity in the transistor $T_{H1}$ as well as a reduction in resistance loss due to low on-resistance; and it is possible to achieve a reduction in switching loss due to low gate capacity in the transistor $T_{H3}$ as well as a reduction in resistance loss due to low on-resistance. Also, safety is ensured because the positive pole and negative pole of the main battery 7 are not short circuited even when either of the transistors $T_{H1}$ and $T_{H3}$ short circuit due to failure. In the bidirectional DC/DC converter according to a fourth advantageous configuration example shown in FIG. 18, the configuration is one in which the transistors $T_{H1}$ and $T_{H3}$ are normally-on devices, and the transistors $T_{H2}$ and $T_{H4}$ are normally-off devices, but the reverse configuration is also possible in which the transistors $T_{H1}$ and $T_{H3}$ are normally-off devices, and the transistors $T_{H2}$ and $T_{H4}$ are normally-on devices. In the case that a compound transistor is used as the normally-on device, a built-in diode is not formed between the source and drain in the case of, e.g., a GaN-based transistor. Also, the performance of the built-in diode formed between the source and drain in the case of, e.g., a SiC-based transistor is not good, and it is therefore preferred that a diode be connected in parallel to the normally-on devices (transistors $T_{H1}$ and $T_{H3}$), as shown in FIG. 18.

The embodiments described above and the details of the modifications described above can be implemented in any combination as long as there is no incompatibility.

What is claimed is:

1. A push-pull circuit comprising:
a first switching element having one end connected to one end of an inductive load and the other end connected to one end of a DC power source;
a second switching element having one end connected to the other end of the inductive load and the other end connected to the one end of the DC power source;
a first rectifier element;
a third switching element for switching a first pathway between conductance and cutoff, the first pathway leading from a connection point between one end of the first switching element and the one end of the inductive load, via the first rectifier element, to a connection point between the other end of the DC power source and a center tap of the inductive load;
a second rectifier element; and
a fourth switching element for switching a second pathway between conductance and cutoff, the second pathway leading from a connection point between one end of the second switching element and the other end of the inductive load, via the second rectifier element, to a connection point between the other end of the DC power source and the center tap of the inductive load;
wherein the first rectifier element and the third switching element are connected in series with each other and disposed on the first pathway,
wherein the second rectifier element and the fourth switching element are connected in series with each other and disposed on the second pathway.

2. The push-pull circuit of claim 1,
each of the first to fourth switching elements being switched ON or OFF so that
the third switching element is in an ON state when the first switching element switches from ON to OFF, and the third switching element is in an OFF state when the second switching element switches from OFF to ON; and
the fourth switching element is in an ON state when the second switching element switches from ON to OFF, and the fourth switching element is in an OFF state when the first switching element switches from OFF to ON.

3. The push-pull circuit of claim 1,
the third switching element and the fourth switching element being normally-off transistors; and
the push-pull circuit further comprising:
a first power source circuit for generating voltage for setting one of the third switching element and the fourth switching element to ON, using the voltage of the connection point between one end of the first switching element and one end of the inductive load; and
a second power source circuit for generating voltage for setting the other of the third switching element and the fourth switching element to ON, using the voltage of the connection point between one end of the second switching element and the other end of the inductive load.

4. The push-pull circuit of claim 1,
the third switching element and the fourth switching element being normally-on transistors.

5. The push-pull circuit of claim 1,
the third switching element and the fourth switching element being PNP bipolar transistors.

6. The push-pull circuit of claim 1,
the first rectifier element and the second rectifier element being switching elements for synchronous rectification.

7. The push-pull circuit of claim 6,
the first to fourth switching elements, the first rectifier element, and the second rectifier element being switched ON or OFF so that
the first rectifier element switches from OFF to ON after the first switching element has switched from ON to OFF, and the first rectifier element switches from ON to OFF before the third switching element switches from ON to OFF; and
the second rectifier element switches from OFF to ON after the second switching element has switched from ON to OFF, and the second rectifier element switches from ON to OFF before the fourth switching element switches from ON to OFF.

8. A DC/DC converter comprising:
a transformer; and
a push-pull circuit connected to the transformer,
the push-pull circuit comprising:
a first switching element having one end connected to one end of an inductive load and the other end connected to one end of a DC power source;
a second switching element having one end connected to the other end of the inductive load and the other end connected to the one end of the DC power source;
a first rectifier element;
a third switching element for switching a first pathway between conductance and cutoff, the first pathway leading from a connection point between one end of the first switching element and the one end of the inductive load, via the first rectifier element, to a connection point between the other end of the DC power source and a center tap of the inductive load;
a second rectifier element; and
a fourth switching element for switching a second pathway between conductance and cutoff, the second pathway leading from a connection point between one end of the second switching element and the other end of the inductive load, via the second rectifier element, to a connection point between the other end of the DC power source and the center tap of the inductive load;
wherein the first rectifier element and the third switching element are connected in series with each other and disposed on the first pathway,
wherein the second rectifier element and the fourth switching element are connected in series with each other and disposed on the second pathway.

9. A solar charging system comprising:
a solar cell;
a first storage device for storing power outputted from the solar cell;
a second storage device having greater storage capacity than the first storage device; and
a DC/DC converter for DC/DC converting DC voltage outputted from the first storage device and feeding the converted voltage to the second storage device;
the DC/DC converter comprising:
a transformer; and
a push-pull circuit connected to the transformer; and
the push-pull circuit comprising:
a first switching element having one end connected to one end of an inductive load and the other end connected to one end of a DC power source;
a second switching element having one end connected to the other end of the inductive load and the other end connected to the one end of the DC power source;
a first rectifier element;
a third switching element for switching a first pathway between conductance and cutoff, the first pathway leading from a connection point between one end of the first switching element and the one end of the inductive load, via the first rectifier element, to a connection point between the other end of the DC power source and a center tap of the inductive load;
a second rectifier element; and
a fourth switching element for switching a second pathway between conductance and cutoff, the second pathway leading from a connection point between one end of the second switching element and the other end of the inductive load, via the second rectifier element, to a connection point between the other end of the DC power source and the center tap of the inductive load;
wherein the first rectifier element and the third switching element are connected in series with each other and disposed on the first pathway,
wherein the second rectifier element and the fourth switching element are connected in series with each other and disposed on the second pathway.

10. A movable body comprising:
a solar charging system; and
a propelling portion that moves the movable body;
the solar charging system comprising:
a solar cell;
a first storage device for storing power outputted from the solar cell;
a second storage device having greater storage capacity than the first storage device; and
a DC/DC converter for DC/DC converting DC voltage outputted from the first storage device and feeding the converted voltage to the second storage device; wherein
power output from the second storage device is used as power for driving the propelling portion;
the DC/DC converter comprising:
a transformer; and
a push-pull circuit connected to the transformer; and
the push-pull circuit comprising:
a first switching element having one end connected to one end of an inductive load and the other end connected to one end of a DC power source;
a second switching element having one end connected to the other end of the inductive load and the other end connected to the one end of the DC power source;
a first rectifier element;
a third switching element for switching a first pathway between conductance and cutoff, the first pathway leading from a connection point between one end of the first switching element and the one end of the inductive load, via the first rectifier element, to a connection point between the other end of the DC power source and a center tap of the inductive load;
a second rectifier element; and
a fourth switching element for switching a second pathway between conductance and cutoff, the second pathway leading from a connection point between one end of the second switching element and the other end of the inductive load, via the second rectifier element, to a connection point between the other end of the DC power source and the center tap of the inductive load;

wherein the first rectifier element and the third switching element are connected in series with each other and disposed on the first pathway, wherein the second rectifier element and the fourth switching element are connected in series with each other and disposed on the second pathway.

* * * * *